(12) United States Patent
Ichikawa et al.

(10) Patent No.: US 8,924,107 B2
(45) Date of Patent: Dec. 30, 2014

(54) CONTROL DEVICE AND CONTROL METHOD FOR AUTOMATIC TRANSMISSION

(71) Applicants: Masatake Ichikawa, Kariya (JP); Yutaka Teraoka, Anjo (JP); Hiroyasu Amano, Anjo (JP)

(72) Inventors: Masatake Ichikawa, Kariya (JP); Yutaka Teraoka, Anjo (JP); Hiroyasu Amano, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 13/777,690

(22) Filed: Feb. 26, 2013

(65) Prior Publication Data

US 2013/0261910 A1    Oct. 3, 2013

(30) Foreign Application Priority Data

Mar. 28, 2012    (JP) ................. 2012-074054

(51) Int. Cl.
| F16H 61/06 | (2006.01) |
| F16H 61/08 | (2006.01) |
| F16H 61/00 | (2006.01) |
| F16H 61/20 | (2006.01) |
| F16H 59/18 | (2006.01) |
| F16H 61/686 | (2006.01) |

(52) U.S. Cl.
CPC .......... *F16H 61/0021* (2013.01); *F16H 61/061* (2013.01); *F16H 2061/207* (2013.01); *F16H 59/18* (2013.01); *F16H 61/686* (2013.01); *F16H 2061/062* (2013.01); *F16H 2306/36* (2013.01); *F16H 2312/022* (2013.01)
USPC .................. 701/58; 701/51; 701/66; 701/67; 701/68; 477/34; 477/70; 477/80; 477/116; 477/180; 180/336

(58) Field of Classification Search
None
See application file for complete search history.

(56) References Cited

U.S. PATENT DOCUMENTS

| 4,829,853 A | 5/1989 | Sakaguchi |
| 5,772,553 A | 6/1998 | Tsukamoto et al. |

(Continued)

FOREIGN PATENT DOCUMENTS

| JP | B2-61-57214 | 12/1986 |
| JP | A-07-069103 | 3/1995 |

(Continued)

OTHER PUBLICATIONS

Mar. 19, 2013 International Search Report issued in PCT/JP2013/053329 (with translation).

(Continued)

*Primary Examiner* — John R Olszewski
*Assistant Examiner* — Gerrard A Foster
(74) *Attorney, Agent, or Firm* — Oliff PLC

(57) ABSTRACT

A control device for an automatic transmission mounted on a vehicle to establish a plurality of shift speeds by engaging engagement elements that need to be engaged for each shift speed. The control device includes a target shift speed setting device, a during-travel neutral control device and a prediction control device. The prediction control device takes action when a predicted prechange time becomes equal to or less than a predetermined time while the automatic transmission is in the neutral state, the predicted prechange time being a time predicted on the basis of variations in vehicle speed and being a time before implementation of a change of the target shift speed that involves changing the particular engagement element from a disengaged state to an engaged state in order to maintain the neutral state.

5 Claims, 12 Drawing Sheets

(56) References Cited

U.S. PATENT DOCUMENTS

| | | | |
|---|---|---|---|
| 2002/0038580 A1* | 4/2002 | Horiguchi | 74/732.1 |
| 2004/0242359 A1* | 12/2004 | Sugawara et al. | 475/116 |
| 2010/0250075 A1 | 9/2010 | Suzuki et al. | |
| 2011/0238248 A1 | 9/2011 | Suzuki et al. | |

FOREIGN PATENT DOCUMENTS

| | | |
|---|---|---|
| JP | B2-2885053 | 4/1995 |
| JP | B2-7-94865 | 10/1995 |
| JP | A-9-72415 | 3/1997 |
| JP | A-2011-214673 | 10/2001 |
| JP | B2-3855966 | 12/2006 |
| JP | A-2008-275001 | 11/2008 |
| JP | A-2010-223399 | 10/2010 |
| JP | A-2011-202737 | 10/2011 |
| WO | WO 2008/132591 A2 | 11/2008 |
| WO | WO 2011/122115 A1 | 10/2011 |

OTHER PUBLICATIONS

Jul. 3, 2012 International Search Report issued in International Application No. PCT/JP2012/058401 (with translation).

U.S. Appl. No. 13/985,742, filed Aug. 15, 2013 in the name of Suzuki.

\* cited by examiner

FIG. 3

|  | C-1 | C-2 | C-3 | B-1 | B-2 | F-1 |
|---|---|---|---|---|---|---|
| P |  |  |  |  |  |  |
| REV |  |  | ○ |  | ○ |  |
| N |  |  |  |  |  |  |
| D 1st | ○ |  |  |  | ● | ○ |
| D 2nd | ○ |  |  | ○ |  |  |
| D 3rd | ○ |  | ○ |  |  |  |
| D 4th | ○ | ○ |  |  |  |  |
| D 5th |  | ○ | ○ |  |  |  |
| D 6th |  | ○ |  | ○ |  |  |

○: ENGAGED, ●: ENGAGED WITH ENGINE BRAKE IN OPERATION

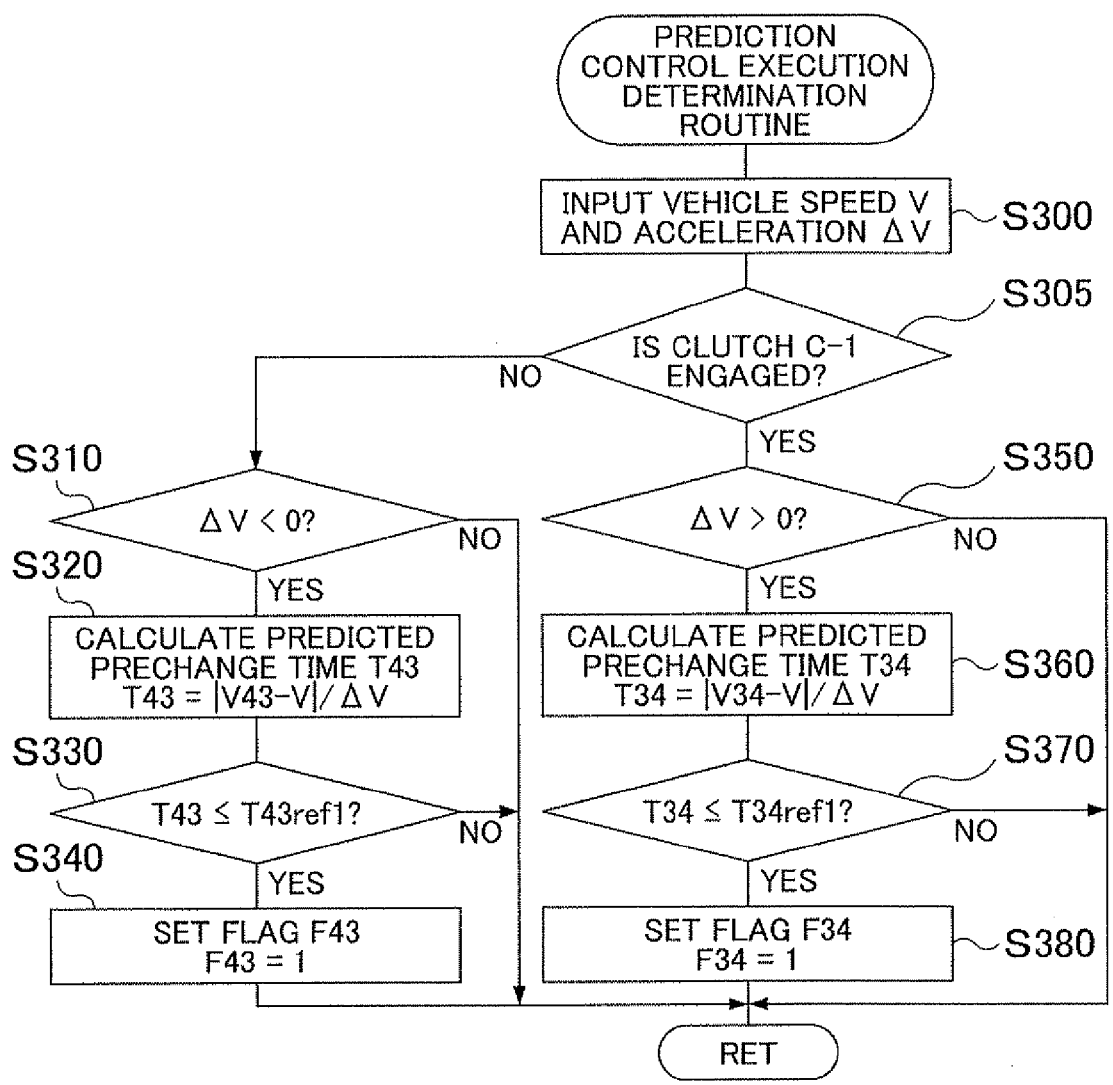

|  | C-1 | C-2 | C-3 | C-4 | C-5 | C-6 | B-1 | B-2 | F-1 |
|---|---|---|---|---|---|---|---|---|---|
| D 1st | ○ |  |  |  | ○ |  |  | ● | ○ |
| 2nd | ○ |  |  |  | ○ |  | ○ |  |  |
| 3rd | ○ |  |  |  |  | ○ | ○ |  |  |
| 4th | ○ |  | ○ |  |  | ○ |  |  |  |
| 5th | ○ |  |  |  | ○ | ○ |  |  |  |
| 6th | ○ | ○ |  |  |  | ○ |  |  |  |
| 7th |  | ○ |  | ○ |  | ○ |  |  |  |
| OD1 |  | ○ | ○ |  |  | ○ |  |  |  |
| OD2 |  | ○ | ○ |  | ○ |  |  |  |  |
| OD3 |  | ○ |  |  | (○) |  | ○ |  |  |
| R Rev1 |  |  | ○ |  | ○ |  |  | ○ |  |
| Rev2 |  |  | ○ |  |  | ○ |  | ○ |  |
| Rev3 |  |  |  | ○ | ○ |  |  | ○ |  |
| Rev4 |  |  |  | ○ |  | ○ |  | ○ |  |

○: ENGAGED, ●: ENGAGED WITH ENGINE BRAKE IN OPERATION

CONTROL DEVICE AND CONTROL METHOD FOR AUTOMATIC TRANSMISSION

INCORPORATION BY REFERENCE

The disclosure of Japanese Patent Application No. 2012-074054 filed on Mar. 28, 2012 including the specification, drawings and abstract is incorporated herein by reference in its entirety

BACKGROUND OF THE INVENTION

The present invention relates to a control device and a control method for an automatic transmission, and in particular to a control device and a control method for an automatic transmission mounted on a vehicle to establish a plurality of shift speeds by engaging engagement elements that need to be engaged for each shift speed.

DESCRIPTION OF THE RELATED ART

Hitherto, there has been proposed a control device for an automatic transmission mounted on a vehicle and having an input shaft and an output shaft coupled to an engine side and a wheel side, respectively, to establish a plurality of shift speeds by engaging two of a plurality of engagement elements such as clutches and brakes. In controlling the automatic transmission, it is determined whether the shift speed of the automatic transmission established when the engine is in an idling state during travel is a lower shift speed (first to third speeds) established with engagement of a starting clutch or a higher shift speed (fourth to sixth speeds) established without engagement of the starting clutch, and in case of the lower shift speed, the starting clutch is maintained in an engaged state, and in case of the higher shift speed, all the engagement elements including the starting clutch are disengaged to bring the automatic transmission into a neutral state (see Japanese Patent Application Publication No. 2011-202737 (JP 2011-202737A), for example). With the device, the rotational drive force of the engine can be quickly transferred to an output member (a vehicle wheel side) when the engine is brought out of the idling state to drive the vehicle using the rotational drive force of the engine while avoiding drag of the engine in the idling state (engine braking).

SUMMARY OF THE INVENTION

With the control device for an automatic transmission discussed above, in order to enhance the responsiveness of transfer of a drive force when the engine is brought out of the idling state to drive the vehicle using the rotational drive force of the engine (that is, at the time of re-acceleration), in other words, in order to enhance the responsiveness of the vehicle, it is considered to bring the automatic transmission into the neutral state with one engagement element, that is, an engagement element other than the starting clutch, in the engaged state even in the case where the higher shift speed, establishment of which does not require engagement of the starting clutch, is established when the engine is in the idling state, as in the case where the lower shift speed is established. In this case, however, the responsiveness of re-acceleration may not be enhanced. For example, if the vehicle speed is varied while the vehicle is traveling through inertia with the automatic transmission in the neutral state, a target shift speed that is to be established at the time of re-acceleration is changed, and engagement elements to be engaged in preparation for re-acceleration are in turn changed, which raises the need for an interchange of engagement elements to be engaged. In this case, it may take a long time before the target shift speed is established, depending on the timing of an interchange of engagement elements to be engaged in preparation for re-acceleration and the timing of a request to establish the target shift speed at the time of re-acceleration which is made by depressing an accelerator pedal or the like.

A main object of the control device and the control method for an automatic transmission according to the present invention is to improve the responsiveness of re-acceleration during travel with the automatic transmission in the neutral state.

In order to achieve the foregoing main object, the control device and the control method for an automatic transmission according to the present invention adopt the following means.

A first aspect of the present invention provides a control device for an automatic transmission mounted on a vehicle to establish a plurality of shift speeds by engaging engagement elements that need to be engaged for each shift speed, the control device including: target shift speed setting means for setting a target shift speed on the basis of a vehicle speed; during-travel neutral control means for bringing the automatic transmission into a neutral state by bringing a part of an engagement element determined in advance, of engagement elements that need to be engaged to establish the target shift speed, into an engaged state and bringing the remaining engagement elements into a disengaged state when predetermined neutral conditions are met while the vehicle is traveling; and prediction control means for starting supply of a hydraulic pressure to an oil chamber of a particular engagement element to move a piston of the particular engagement element with the particular engagement element having no torque capacity with the a part of an engagement element kept engaged when a predicted prechange time becomes equal to or less than a predetermined time while the automatic transmission is in the neutral state, the predicted prechange time being a time predicted on the basis of variations in vehicle speed and being a time before implementation of a change of the target shift speed that involves changing the particular engagement element from a disengaged state to an engaged state in order to maintain the neutral state.

In the control device for an automatic transmission according to the first aspect, the automatic transmission is brought into a neutral state by bringing a part of an engagement element determined in advance, of engagement elements that need to be engaged to establish a target shift speed set on the basis of a vehicle speed, into an engaged state and bringing the remaining engagement elements into a disengaged state when predetermined neutral conditions are met while the vehicle is traveling. This allows the target shift speed of the automatic transmission to be established by only engaging the remaining engagement elements during re-acceleration of the vehicle, thereby immediately establishing the target shift speed for re-acceleration. Then, supply of a hydraulic pressure to an oil chamber of a particular engagement element is started to move a piston of the particular engagement element with the particular engagement element having no torque capacity with the a part of an engagement element kept engaged when a predicted prechange time becomes equal to or less than a predetermined time while the automatic transmission is in the neutral state, the predicted prechange time being a time predicted on the basis of variations in vehicle speed and being a time before implementation of a change of the target shift speed that involves changing the particular engagement element from a disengaged state to an engaged state in order to maintain the neutral state. Here, if the target shift speed is changed because of variations in vehicle speed during travel with the automatic transmission in the neutral state, it may be necessary to disengage the a part of an engagement element which has been engaged and switch the particular engagement element from a disengaged state to an engaged state in order to maintain the neutral state. If establishment of the target shift speed is requested for re-acceleration in the middle of switching the engagement element, however, it is necessary to engage the engagement elements that need to be engaged to establish the target shift speed, including the particular engagement element. Therefore, it may take a long time before the target shift speed is established compared to a case where establishment of the target shift speed is requested in the neutral state with the a part of an engagement element engaged. By starting supply of a hydraulic pressure to the oil chamber of the particular engagement element (or having such supply started beforehand) to move the piston of the particular engagement element with the particular engagement element having no torque capacity with the a part of an engagement element kept engaged when the predicted prechange time predicted on the basis of variations in vehicle speed becomes equal to or less than the predetermined time, in contrast, it is possible to suppress an increase in time before the target shift speed is established after such establishment of the target shift speed is requested after the target shift speed is changed during travel with the automatic transmission in the neutral state. As a result, the responsiveness of re-acceleration during travel with the automatic transmission in the neutral state can be improved. Here, the "predetermined neutral conditions" may include the accelerator being turned off with the shift position being a position for forward travel, and may additionally include the brakes being turned off. The "engagement elements" include dog clutches and dog brakes besides friction engagement elements.

In the control device for an automatic transmission according to the first aspect, the prediction control means may supply a hydraulic pressure to the oil chamber so as to bring the particular engagement element into a state immediately before engagement with the particular engagement element having no torque capacity when the predicted prechange time becomes equal to or less than the predetermined time. With this configuration, it is possible to more reliably suppress an increase in time before the target shift speed is established after such establishment of the target shift speed is requested after the target shift speed is changed during travel with the automatic transmission in the neutral state. In this case, the predetermined time may be determined in advance as a time required to supply a hydraulic pressure to the oil chamber so as to bring the particular engagement element into a state immediately before engagement with the particular engagement element having no torque capacity.

In the control device for an automatic transmission according to the first aspect, in addition, the prediction control means may calculate the predicted prechange time by obtaining a vehicle speed difference, by subtracting a current vehicle speed from a vehicle speed threshold determined in advance as a vehicle speed at which the target shift speed is changed, and dividing the vehicle speed difference by an acceleration of the vehicle. With this configuration, the predicted prechange time can be calculated more adequately. Here, the "vehicle speed threshold" may be set in a speed change map determined in advance.

In the control device for an automatic transmission according to the first aspect, further, the a part of an engagement element determined in advance may be an engagement element that needs to be commonly engaged to establish a shift speed one step lower than the target shift speed or a shift speed one step higher than the target shift speed. With this configuration, it is possible to reduce the possibility that the engagement element to be engaged in order to bring the automatic transmission into the neutral state is changed when the target shift speed is changed because of variations in vehicle speed. Here, the phrase "shift speed one step lower than the target shift speed" refers to a shift speed that is the closest to the target shift speed among shift speeds lower than the target shift speed, and corresponds to the second speed in the case where the transmission has six speeds and the target shift speed is the third speed, for example. The phrase "shift speed one step higher than the target shift speed" refers to a shift speed that is the closest to the target shift speed among shift speeds higher than the target shift speed, and corresponds to the fourth speed in the case where the transmission has six speeds and the target shift speed is the third speed, for example.

In the control device for an automatic transmission according to the first aspect, in addition, the prediction control means may cancel supply of a hydraulic pressure to the oil chamber of the particular engagement element when the predicted prechange time becomes equal to or more than a second predetermined time which is longer than the predetermined time after supply of a hydraulic pressure to the oil chamber of the particular engagement element is started. With this configuration, unnecessary supply of a hydraulic pressure to the particular engagement element can be suppressed in the case where it is predicted that the target shift speed is not changed even after the second predetermined time since the vehicle speed is varied by variations in gradient of the running road surface after it is predicted that the target shift speed is changed in the predetermined time.

A second aspect of the present invention also provides a control method for an automatic transmission mounted on a vehicle to establish a plurality of shift speeds by engaging engagement elements that need to be engaged for each shift speed, the control method including: (a) bringing the automatic transmission into a neutral state by bringing a part of an engagement element determined in advance, of engagement elements that need to be engaged to establish a target shift speed set on the basis of a vehicle speed, into an engaged state and bringing the remaining engagement elements into a disengaged state when predetermined neutral conditions are met while the vehicle is traveling; and (b) starting supply of a hydraulic pressure to an oil chamber of a particular engagement element to move a piston of the particular engagement element with the particular engagement element having no torque capacity with the a part of an engagement element kept engaged when a predicted prechange time becomes equal to or less than a predetermined time while the automatic transmission is in the neutral state, the predicted prechange time being a time predicted on the basis of variations in vehicle speed and being a time before implementation of a change of the target shift speed that involves changing the particular engagement element from a disengaged state to an engaged state in order to maintain the neutral state.

In the control method for an automatic transmission according to the second aspect, the automatic transmission is brought into a neutral state by bringing a part of an engagement element determined in advance, of engagement elements that need to be engaged to establish a target shift speed set on the basis of a vehicle speed, into an engaged state and bringing the remaining engagement elements into a disengaged state when predetermined neutral conditions are met while the vehicle is traveling. This allows the target shift speed of the automatic transmission to be established by only engaging the remaining engagement elements during re-acceleration of the vehicle, thereby immediately establishing the target shift speed for re-acceleration. Then, supply of a hydraulic pressure to an oil chamber of a particular engagement element is started (has been started beforehand) to move a piston of the particular engagement element with the particular engagement element having no torque capacity with the a part of an engagement element kept engaged when a predicted prechange time becomes equal to or less than a predetermined time while the automatic transmission is in the neutral state, the predicted prechange time being a time predicted on the basis of variations in vehicle speed and being a time before implementation of a change of the target shift speed that involves changing the particular engagement element from a disengaged state to an engaged state in order to maintain the neutral state. With this configuration, it is possible to suppress an increase in time before the target shift speed is established after such establishment of the target shift speed is requested after the target shift speed is changed during travel with the automatic transmission in the neutral state. As a result, the responsiveness of re-acceleration during travel with the automatic transmission in the neutral state can be improved.

BRIEF DESCRIPTION OF THE DRAWINGS

FIG. 3 is an operation table showing the relationship between each shift speed of the automatic transmission 30 and the respective operating states of clutches C1 to C3 and brakes B-1 and B-2;

FIG. 7 is a flowchart showing an example of a prediction control execution determination routine executed by the transmission ECU 80;

FIG. 8 illustrates the relationship between an element to be turned on and an element to be turned off in a neutral state, of engagement elements that need to be engaged to establish a target shift speed GS* of the automatic transmission 30;

DETAILED DESCRIPTION OF THE EMBODIMENTS

Now, an embodiment of the present invention will be described below.

Figure 1:
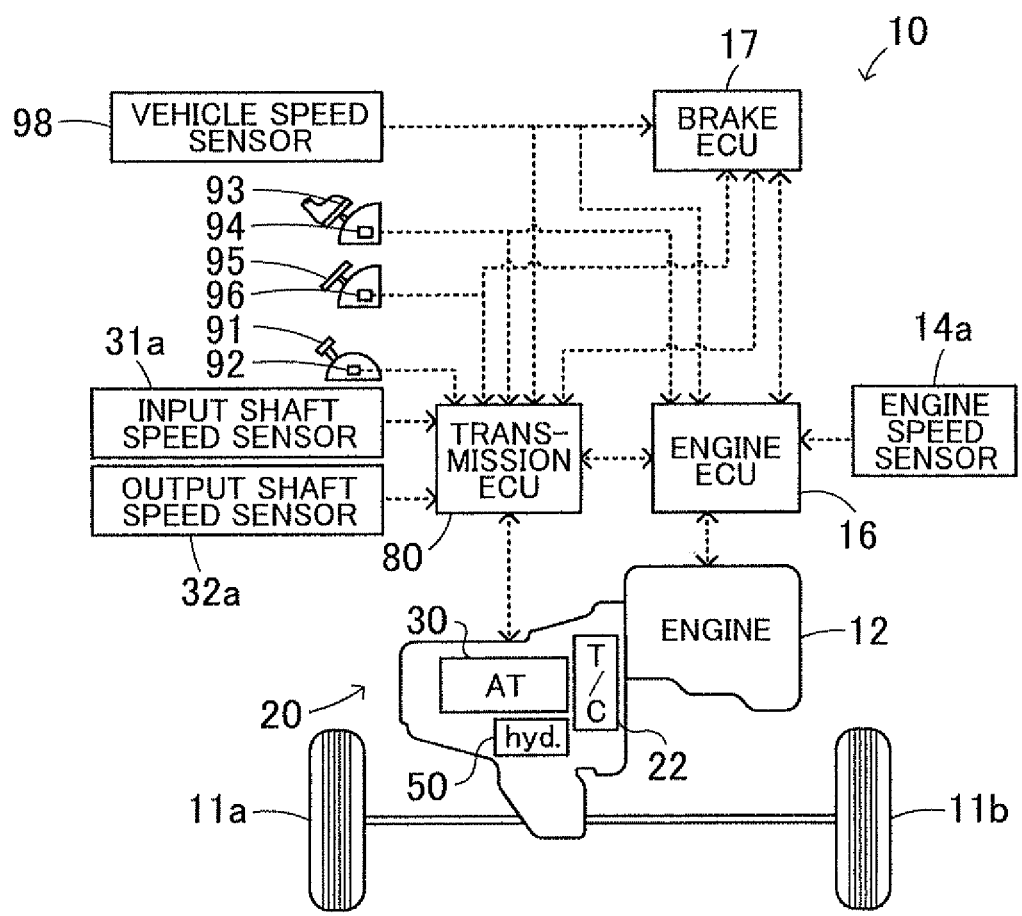
FIG. 1 is a diagram showing a schematic configuration of an automobile 10 on which an automatic transmission 30 controlled by a transmission electronic control unit 80 according to an embodiment of the present invention is mounted.
Figure 2:
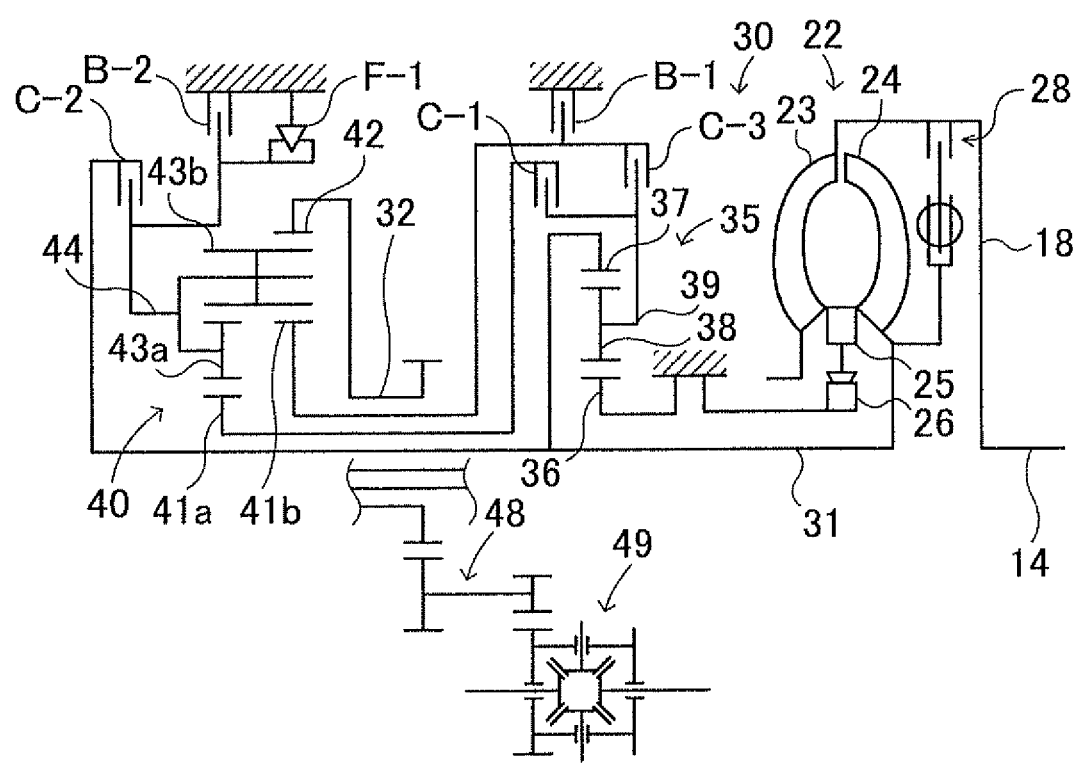
FIG. 2 is a diagram showing a schematic mechanical configuration of an automatic speed change device 20 including the automatic transmission 30.

FIG. 1 is a diagram showing a schematic configuration of an automobile 10 on which an automatic transmission 30 controlled by a transmission electronic control unit 80 according to an embodiment of the present invention is mounted. FIG. 2 is a diagram showing a schematic mechanical configuration of an automatic speed change device 20 including the automatic transmission 30. As shown in FIGS. 1 and 2, the automobile 10 according to the embodiment includes an engine 12 which is an internal combustion engine that outputs power generated by explosive combustion of a hydrocarbon fuel such as gasoline and light oil, an engine electronic control unit (hereinafter referred to as "engine ECU") 16 that controls operation of the engine 12, a fluid transmission apparatus 22 attached to a crankshaft 14 of the engine 12, a stepped automatic transmission 30 including an input shaft 31 connected to the output side of the fluid transmission apparatus 22 and an output shaft 32 connected to drive wheels 11a and 11b via a gear mechanism 48 and a differential gear 49 to transfer to the output shaft 32 power input to the input shaft 31 while changing the speed of the power, a hydraulic circuit 50 that supplies hydraulic oil to the fluid transmission apparatus 22 and the automatic transmission 30, a transmission electronic control unit (hereinafter referred to as "transmission ECU") 80 that controls the fluid transmission apparatus 22 and the automatic transmission 30 by controlling the hydraulic circuit 50, and a brake electronic control unit (hereinafter referred to as "brake ECU") 17 that controls an electronically controlled hydraulic brake unit (not shown). Here, the automatic speed change device 20 is mainly composed of the automatic transmission 30, the hydraulic circuit 50, and the transmission ECU 80.

The engine ECU 16 is formed as a microprocessor including a CPU as its main component, and includes a ROM that stores a processing program, a RAM that temporarily stores data, input and output ports, and a communication port in addition to the CPU. Signals from various sensors that detect the operating state of the engine 12, such as an engine speed Ne from a rotational speed sensor 14a attached to the crankshaft 14, and an accelerator operation amount Acc from an accelerator pedal position sensor 94 that detects the accelerator operation amount Acc corresponding to the amount of depression of an accelerator pedal 93, a vehicle speed V from a vehicle speed sensor 98, and the like are input to the engine ECU 16 via the input port. Signals such as a drive signal for a throttle motor that drives a throttle valve, a control signal for a fuel injection valve, and an ignition signal for an ignition plug are output from the engine ECU 16 via the output port.

As shown in FIG. 2, the fluid transmission apparatus 22 is formed as a fluidic torque converter with a lock-up clutch, and includes a pump impeller 23 serving as an input-side fluid transmission element connected to the crankshaft 14 of the engine 12 via a front cover 18, a turbine runner 24 serving as an output-side fluid transmission element connected to the input shaft 31 of the automatic transmission 30 via a turbine hub, a stator 25 disposed inside the pump impeller 23 and the turbine runner 24 to rectify the flow of hydraulic oil from the turbine runner 24 to the pump impeller 23, a one-way clutch 26 that restricts rotation of the stator 25 to one direction, and a lock-up clutch 28 having a damper mechanism. The fluid transmission apparatus 22 functions as a torque amplifier through the action of the stator 25 when the difference between the respective rotational speeds of the pump impeller 23 and the turbine runner 24 is large, and functions as a fluid coupling when the difference between the respective rotational speeds of the pump impeller 23 and the turbine runner 24 is small. The lock-up clutch 28 can establish and release lock-up in which the pump impeller 23 (front cover 18) and the turbine runner 24 (turbine hub) are coupled to each other. When conditions for turning on lock-up are met after the automobile 10 starts moving, the lock-up clutch 28 establishes lock-up between the pump impeller 23 and the turbine runner 24 so that power from the engine 12 is mechanically and directly transferred to the input shaft 31. In this event, variations in torque to be transferred to the input shaft 31 are absorbed by the damper mechanism.

The automatic transmission 30 is formed as a 6-speed stepped transmission, and includes a single-pinion type planetary gear mechanism 35, a Ravigneaux type planetary gear mechanism 40, three clutches C-1, C-2, and C-3, two brakes B-1 and B-2, and a one-way clutch F-1. The single-pinion type planetary gear mechanism 35 includes a sun gear 36 which is an externally toothed gear, a ring gear 37 which is an internally toothed gear disposed concentrically with the sun gear 36, a plurality of pinion gears 38 meshed with the sun gear 36 and meshed with the ring gear 37, and a carrier 39 that holds the plurality of pinion gears 38 such that the pinion gears 38 are rotatable about their respective axes and revolvable around a common axis. The sun gear 36 is fixed to a case. The ring gear 37 is connected to the input shaft 31. The Ravigneaux type planetary gear mechanism 40 includes two sun gears 41a and 41b which are each an externally toothed gear, a ring gear 42 which is an internally toothed gear, a plurality of short pinion gears 43a meshed with the sun gear 41a, a plurality of long pinion gears 43b meshed with the sun gear 41b and the plurality of short pinion gears 43a and meshed with the ring gear 42, and a carrier 44 that couples the plurality of short pinion gears 43a and the plurality of long pinion gears 43b to each other and that holds the gears 43a and the gears 43b such that the hears 43a and the gears 43b are rotatable about their respective axes and revolvable around a common axis. The sun gear 41a is connected to the carrier 39 of the single-pinion type planetary gear mechanism 35 via the clutch C-1. The sun gear 41b is connected to the carrier 39 via the clutch C-3, and connected to the case via the brake B-1. The ring gear 42 is connected to the output shaft 32. The carrier 44 is connected to the input shaft 31 via the clutch C-2. The carrier 44 is also connected to the case via the brake B-2, and connected to the case via the one-way clutch F-1. In the embodiment, the clutches C-1 to C-3 are each a multi-plate friction-type hydraulic clutch (friction engagement element) having a hydraulic servo formed from a piston, a plurality of friction plates, mating plates, and an oil chamber supplied with hydraulic oil, and the brakes B-1 and B-2 are each a hydraulic brake (friction engagement element) formed as a band brake or a multi-plate friction-type brake having a hydraulic servo formed from a piston, a plurality of friction plates, mating plates, and an oil chamber supplied with hydraulic oil. The clutches C-1 to C-3 and the brakes B-1 and B-2 operate with hydraulic oil supplied thereto and discharged therefrom by the hydraulic circuit 50. FIG. 3 is an operation table showing the relationship between each shift speed of the automatic transmission 30 and the respective operating states of clutches C1 to C3 and brakes B-1 and B-2.

Figure 4:
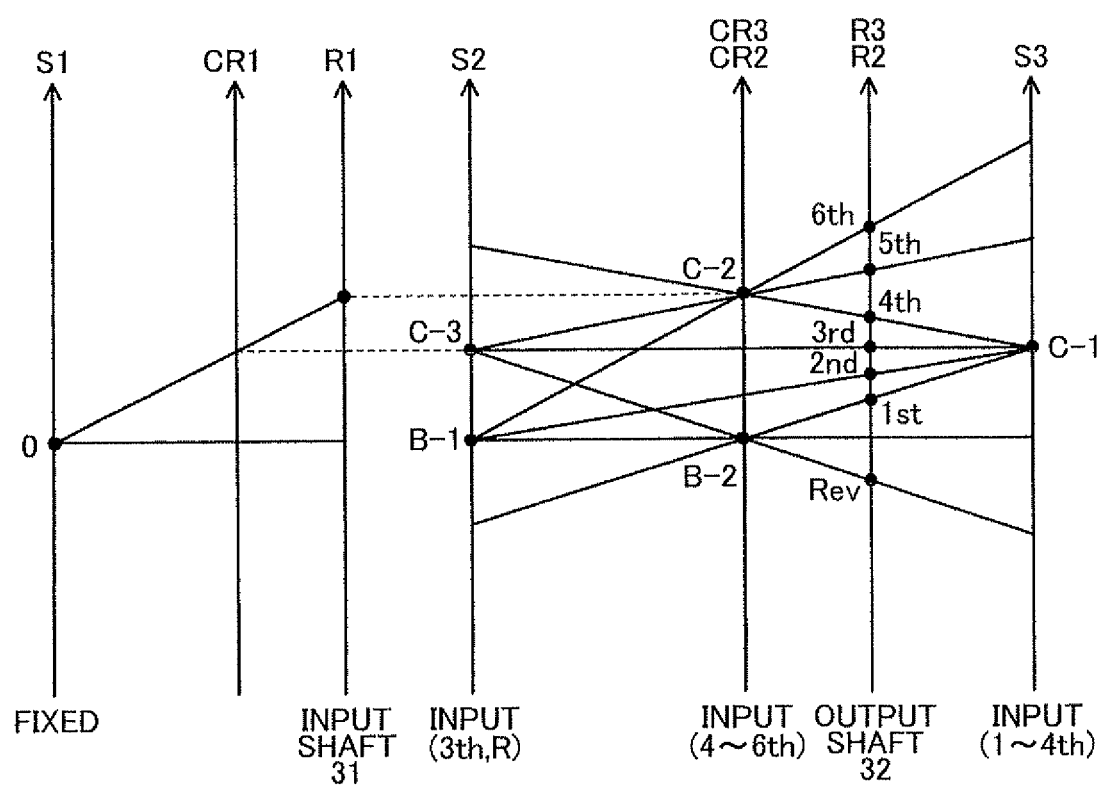
FIG. 4 is a collinear diagram illustrating the relationship between the respective rotational speeds of rotary elements forming the automatic transmission 30.

FIG. 4 is a collinear diagram illustrating the relationship between the respective rotational speeds of rotary elements forming the automatic transmission 30. As shown in the operation table of FIG. 3, the automatic transmission 30 can switchably establish first to sixth forward positions, a reverse position, and a neutral position by turning on and off the clutches C-1 to C-3 (the on state corresponds to the engaged state, and the off state corresponds to the disengaged state) and turning on and off the brakes B-1 and B-2 in various combinations.

The fluid transmission apparatus 22 and the automatic transmission 30 are actuated by the hydraulic circuit 50 drivably controlled by the transmission ECU 80. The hydraulic circuit 50 includes an oil pump that pumps hydraulic oil using power from the engine 12, a primary regulator valve that regulates the hydraulic oil from the oil pump to generate a line pressure PL, a secondary regulator valve that reduces the line pressure PL from the primary regulator valve to generate a secondary pressure Psec, a modulator valve that regulates the line pressure PL from the primary regulator valve to generate a constant modulator pressure Pmod, a manual valve that switches which (of the clutches C-1 to C-3 and the brakes B-1 and B-2) the line pressure PL from the primary regulator valve is supplied to in accordance with the operating position of a shift lever 91, and a plurality of linear solenoid valves that regulate the line pressure PL from the manual valve to generate a solenoid pressure for a corresponding one of the clutches C-1 to C-3 and the brakes B-1 and B-2, none of which is shown.

The transmission ECU 80 is formed as a microprocessor including a CPU as its main component, and includes a ROM that stores a processing program, a RAM that temporarily stores data, input and output ports, and a communication port in addition to the CPU. An input shaft speed Nin from a rotational speed sensor 31a attached to the input shaft 31, an output shaft speed Nout from a rotational speed sensor 32a attached to the output shaft 32, a shift position SP from a shift position sensor 92 that detects the position of the shift lever 91, the accelerator operation amount Acc from the accelerator pedal position sensor 94, a brake pedal position BP from a brake pedal position sensor 96 that detects the amount of depression of a brake pedal 95, the vehicle speed V from the vehicle speed sensor 98, and the like are input to the transmission ECU 80 via the input port. A control signal for the hydraulic circuit 50 and the like are output from the transmission ECU 80 via the output port.

The engine ECU 16, the brake ECU 17, and the transmission ECU 80 are connected to each other via a communication port to exchange various control signals and data required for control with each other. In the embodiment, the shift position SP of the shift lever 91 includes a parking position (P position) used to park the vehicle, a reverse position (R position) for reverse travel, a neutral position (N position), a normal drive position (D position) for forward travel, and an upshift command position and a downshift command position.

Figure 5:
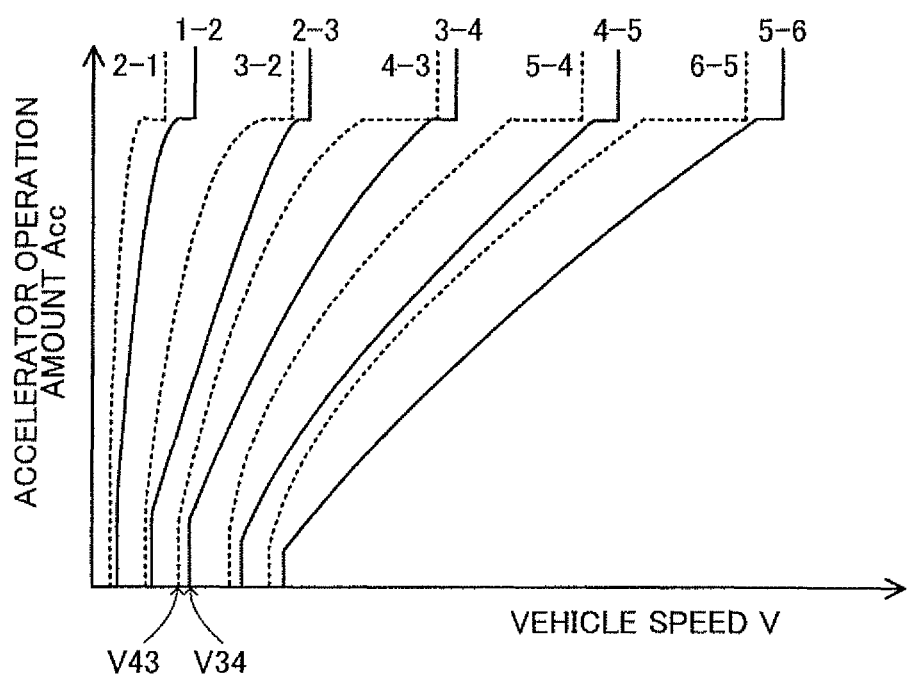
FIG. 5 illustrates an example of a speed change map.

In the thus configured automatic speed change device 20 according to the embodiment, when the shift position SP of the shift lever 91 is the drive position (D position), the clutches C-1 to C-3 and the brakes B-1 and B-2 are turned on and off as shown in the speed change map of FIG. 5. That is, when an operation point defined by the accelerator operation amount Acc and the vehicle speed V crosses a 1-2 upshift line, a 2-3 upshift line, a 3-4 upshift line, a 4-5 upshift line, and a 5-6 upshift line, which are indicated by solid lines in FIG. 5, from left to right with a shift speed indicated by the left numeral or lower (for example, the first and second speeds for the 2-3 upshift line) being established, the clutches C-1 to C-3 and the brakes B-1 and B-2 are turned on and off such that an upshift is performed from the shift speed being established to the shift speed indicated by the right numeral (for example, the third speed for the 2-3 upshift line). Meanwhile, when an operation point defined by the accelerator operation amount Acc and the vehicle speed V crosses a 6-5 downshift line, a 5-4 downshift line, a 4-3 downshift line, a 3-2 downshift line, and a 2-1 downshift line, which are indicated by broken lines in FIG. 5, from right to left with a shift speed indicated by the left numeral or higher (for example, the fourth to sixth speeds for the 4-3 downshift line) being established, the clutches C-1 to C-3 and the brakes B-1 and B-2 are turned on and off such that a downshift is performed from the shift speed being established to the shift speed indicated by the right numeral (for example, the third speed for the 4-3 downshift line). In the drawing, a vehicle speed threshold V43 indicates the vehicle speed V on the 4-3 downshift line at the time when the accelerator is turned off, and a vehicle speed threshold V34 indicates the vehicle speed V on the 3-4 upshift line at the time when the accelerator is turned off.

Figure 6:
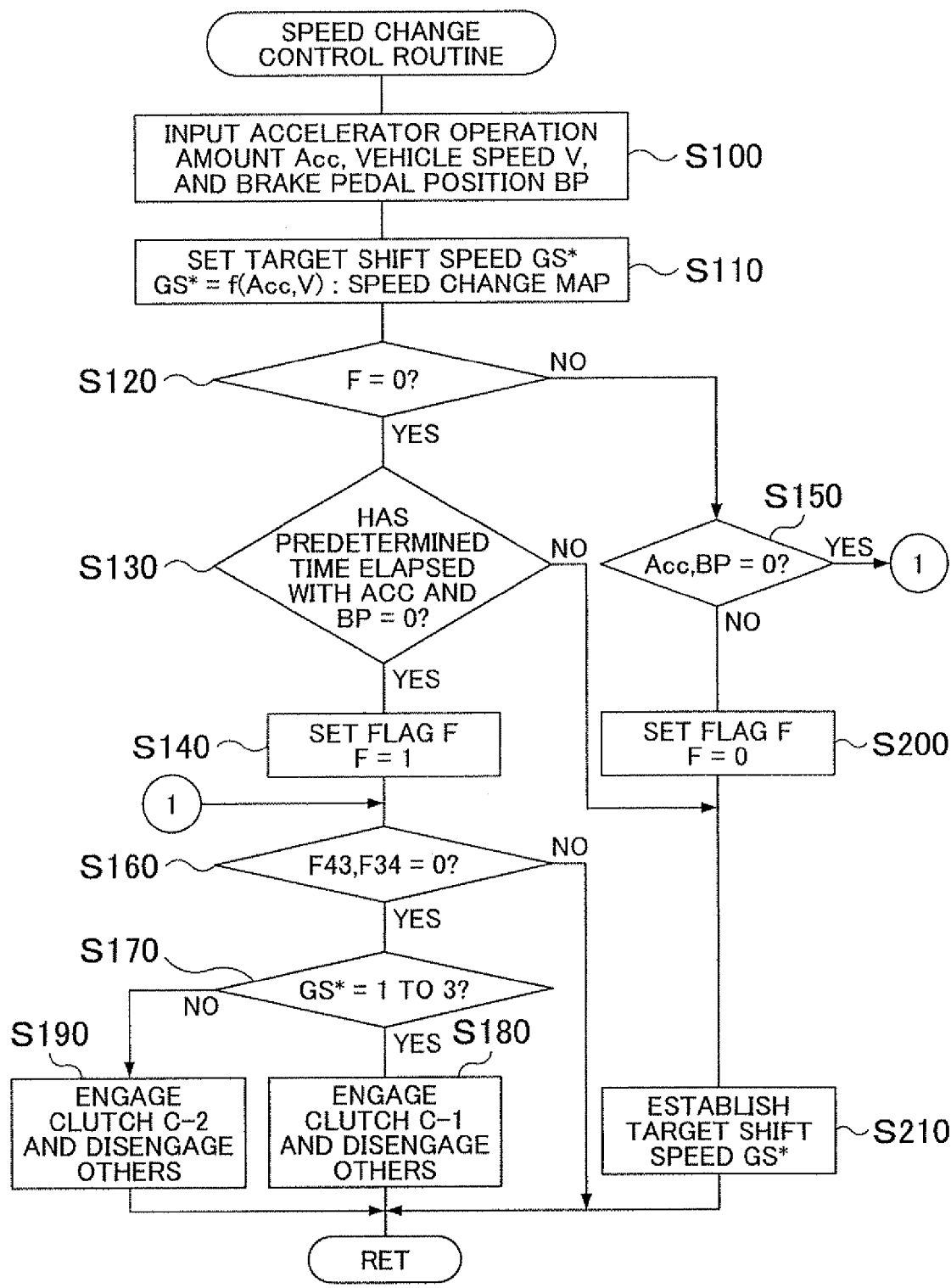
FIG. 6 is a flowchart showing an example of a speed change control routine executed by the transmission ECU 80 when a shift position SP is a drive position (D position)

Next, operation of the automatic speed change device 20 according to the embodiment, in particular operation thereof at the time when the shift position SP of the shift lever 91 is the drive position (D position), will be described. FIG. 6 is a flowchart showing an example of a speed change control routine executed by the transmission ECU 80 when the shift position SP is the drive position (D position) and the vehicle speed V is larger than a value of 0. The routine is executed repeatedly at intervals of a predetermined time (for example, at intervals of several milliseconds or several tens of milliseconds).

When the speed change control routine of FIG. 6 is executed, the transmission ECU 80 first receives data required for control such as the accelerator operation amount Acc from the accelerator pedal position sensor 94, the brake pedal position BP from the brake pedal position sensor 96, and the vehicle speed V from the vehicle speed sensor 98 (step S100), and sets a target shift speed GS* on the basis of the received accelerator operation amount Acc and vehicle speed V and the speed change map illustrated in FIG. 5 (step S110).

Subsequently, the value of an idle coast execution flag F, which indicates whether or not the vehicle is executing travel through inertia with the automatic transmission 30 in the neutral state (hereinafter referred to as "idle coast") is checked (step S120). If the idle coast execution flag F has a value of 0, it is judged that idle coast is not executed. Then, it is checked whether a predetermined time has not elapsed with both the accelerator operation amount Acc and the brake pedal position BP having a value of 0 (step S130), and the clutches C-1 to C-3 and the brakes B-1 and B-2 are turned on and off such that the target shift speed GS* set for the automatic transmission 30 is established (step S210), to terminate the routine. Here, the idle coast execution flag F is set by the routine, and set to a value of 1 when idle coast is executed and to a value of 0 when idle coast is not executed. The conditions that a predetermined time has elapsed with both the accelerator operation amount Acc and the brake pedal position BP having a value of 0 may be considered as conditions for starting execution of idle coast. In idle coast, the vehicle travels through inertia (momentum) using kinetic energy of the vehicle at that time. Thus, in order to confirm the intention of the driver, it is required that both the accelerator operation amount Acc and the brake pedal position BP should have a value of 0, and that such a state should be continued. Thus, the predetermined time may be a time enough to confirm the intention of the driver, such as one second or two seconds, for example. In the embodiment, on/off control of the clutches C1 to C3 and the brakes B1 and 132 is performed as follows. In the case where the clutch C-1 is turned from off to on, for example, a linear solenoid valve corresponding to the clutch C-1 is drivably controlled so as to perform fast fill in which an oil chamber (hydraulic servo) of the clutch C-1 is rapidly filled with hydraulic oil at a relatively high hydraulic pressure determined in advance. Subsequently, stand-by control is executed in which the linear solenoid valve corresponding to the clutch C-1 is drivably controlled such that the hydraulic pressure applied to the oil chamber (hydraulic servo) of the clutch C-1 is reduced to a relatively low hydraulic pressure determined in advance to bring the clutch C-1 into a state immediately before engagement with the clutch C-1 having no torque capacity and cause the clutch C-1 to stand by in that state (low-pressure stand-by). Thereafter, sweep apply control is executed in which the linear solenoid valve corresponding to the clutch C-1 is drivably controlled such that the hydraulic pressure applied to the oil chamber of the clutch C-1 rises to a complete engagement pressure of the clutch C-1. Meanwhile, in the case where the clutch C-1 is turned from on to off, for example, the linear solenoid valve corresponding to the clutch C-1 is drivably controlled such that supply of a hydraulic pressure to the oil chamber of the clutch C-1 is canceled. In the embodiment, on/off control of the other clutches and brakes is performed in the same manner as the on/off control of the clutch C-1.

If it is determined in step S120 that the idle coast execution flag F has a value of 0 and it is determined in step S130 that a predetermined time has elapsed with both the accelerator operation amount Acc and the brake pedal position 13P having a value of 0, it is judged that idle coast should be executed, and the idle coast execution flag F is set to a value of 1 (step S140). Further, a low speed-side change prediction flag F43, which indicates whether or not to start preparation for a change of the target shift speed GS* from the fourth speed or higher to the third speed or lower while the automatic transmission 30 is in the neutral state, and a high speed-side change prediction flag F34, which indicates whether or not to start preparation for a change of the target shift speed GS* from the third speed or lower to the fourth speed or higher while the automatic transmission 30 is in the neutral state, are checked (step S160). Here, the low speed-side change prediction flag F43 is a flag that is initially set to a value of 0 and that is set to a value of 1 by a prediction control execution determination routine illustrated in FIG. 7, which is a process for predicting the presence or absence of a change (downshift) of the target shift speed GS* from the fourth speed or higher to the third speed or lower or a change (upshift) of the target shift speed GS* from the third speed or lower to the fourth speed or higher when the automatic transmission 30 is in the neutral state. Meanwhile, the high speed-side change prediction flag F34 is also a flag that is initially set to a value of 0 and that is set to a value of 1 by the prediction control execution determination routine illustrated in FIG. 7. The low speed-side change prediction flag F43 and the high speed-side change prediction flag F34 are checked in step S160 because the clutches C-1 and C-2 are controlled by other routines to be discussed later (see FIGS. 9 and 10) when the low speed-side change prediction flag F43 is set to a value of 1 and when the high speed-side change prediction flag F34 is set to a value of 1.

If both the low speed-side change prediction flag F43 and the high speed-side change prediction flag F34 have a value of 0, the target shift speed GS* is checked (step S170). If the target shift speed GS* is the first to third speeds, the clutch C-1 is turned on (engaged) and the other clutches C-2 and C-3 and brakes B-1 and B-2 are turned off (disengaged) (step S180) to terminate the routine. In order to cause the automatic transmission 30 to establish any of the first to third speeds, it is necessary to turn on the clutch C-1 and turn on any of the brake B-2, the brake B-1, and the clutch C-3. When the clutch C-1 is turned on and all of the brake B-2, the brake B-1, and the clutch C-3 are turned off, however, none of the first to third speeds is established, and therefore the automatic transmission 30 is brought into the neutral state. Thus, the vehicle thereafter travels through inertia, that is, travels through idle coast. Since the accelerator operation amount Acc has a value of 0 and the automatic transmission 30 is in the neutral state, the engine 12 is caused to run idle under idling control, or operation of the engine 12 is stopped by idle stop. In the embodiment, the neutral state with the clutch C-1 turned on is different from that with the shift position SP of the shift lever 91 being the neutral position (N position). Since the clutch C-1 is turned on, the first to third speeds can be established immediately by turning on any of the brake B-2, the brake B-1, and the clutch C-3. That is, the automatic transmission 30 may be considered as being neutral while being prepared (with the clutch C-1 turned on) to establish the first to third speeds as the target shift speed GS*.

If it is determined in step S170 that the target shift speed GS* is the fourth to sixth speeds, the clutch C-2 is turned on (engaged) and the other clutches C-1 and C-3 and brakes B-1 and B-2 are turned off (disengaged) (step S190) to terminate the routine. In the operation table of FIG. 3, in order to cause the automatic transmission 30 to establish any of the fourth to sixth speeds, it is necessary to turn on the clutch C-2 and turn on any of the clutch C-1, the clutch C-3, and the brake B-1. When the clutch C-2 is turned on and all of the clutch C-1, the clutch C-3, and the brake B-1 are turned off, however, none of the fourth to sixth speeds is established, and therefore the automatic transmission 30 is brought into the neutral state. Thus, the vehicle thereafter travels through idle coast. Also in this case, since the accelerator operation amount Acc has a value of 0 and the automatic transmission 30 is in the neutral state, the engine 12 is caused to run idle under idling control, or operation of the engine 12 is stopped by idle stop. As with the neutral state with the clutch C-1 turned on discussed earlier, the neutral state with the clutch C-2 turned on is different from that with the shift position SP of the shift lever 91 being the neutral position (N position). Since the clutch C-2 is turned on, the fourth to sixth speeds can be established immediately by turning on any of the clutch C-1, the clutch C-3, and the brake B-1. That is, the automatic transmission 30 may be considered as being neutral while being prepared (with the clutch C-2 turned on) to establish the fourth to sixth speeds as the target shift speed GS*.

When the vehicle thus starts traveling through idle coast, it is determined in step S120 that the idle coast execution flag F has a value of 1. It is determined whether or not both the accelerator operation amount Acc and the brake pedal position BP continuously have a value of 0 (step S150). If it is determined that both the accelerator operation amount Acc and the brake pedal position BP continuously have a value of 0, the processes in steps S170 to S190 are performed to continue idle coast in the neutral state with the clutch C-1 turned on or in the neutral state with the clutch C-2 turned on, depending on the target shift speed GS*. When the target shift speed GS* is changed from the fourth speed or higher to the third speed or lower, a transition is made from the neutral state with the clutch C-2 turned on to the neutral state with the clutch C-1 turned on. When the target shift speed GS* is changed from the third speed or lower to the fourth speed or higher, conversely, a transition is made from the neutral state with the clutch C-1 turned on to the neutral state with the clutch C-2 turned on. FIG. 8 illustrates the relationship between an element to be turned on (engaged) and an element to be turned off (disengaged) in a neutral state, of engagement elements that need to be engaged to establish the target shift speed GS* of the automatic transmission 30. As seen from the relationship shown, only the clutch C-2 is turned on when the target shift speed GS* is the fourth to sixth speeds in the automatic transmission 30 in the neutral state during travel through idle coast. When the vehicle speed V falls below the vehicle speed threshold V43 indicated in the speed change map of FIG. 5 because the vehicle is traveling at a reduced speed on a flat road, for example, the element that needs to be engaged is switched (interchanged) from the clutch C-2 to the clutch C-1. Meanwhile, only the clutch C-1 is turned on when the target shift speed GS* is the first to third speeds in the automatic transmission 30 in the neutral state during travel through idle coast. When the vehicle speed V surpasses the vehicle speed threshold V34 indicated in the speed change map of FIG. 5 because the vehicle is traveling at an increased speed on a descending road (downward slope), for example, the element that needs to be engaged is switched (interchanged) from the clutch C-1 to the clutch C-2.

When the driver depresses the accelerator pedal 93 so that the accelerator operation amount Acc does not have a value of 0 any more or depresses the brake pedal 95 so that the brake pedal position BP does not have a value of 0 any more during travel through idle coast, it is determined in step S150 that both the accelerator operation amount Acc and the brake pedal position BP do not have a value of 0. Then, the idle coast execution flag F is set to a value of 0 (step S200), and the clutches C-1 to C-3 and the brakes B-1 and B-2 are turned on and off so as to establish the currently set target shift speed GS* (step S210), to terminate the routine. Now, an occasion where the accelerator pedal 93 is depressed during travel through idle coast in the neutral state with the clutch C-1 turned on is considered. At this time, the target shift speed GS* is any of the first to third speeds, and thus can be established by only turning on one of the brake B-2, the brake B-1, the clutch C-3, although depending on the amount of depression of the accelerator pedal 93. Meanwhile, an occasion where the accelerator pedal 93 is depressed during travel through idle coast in the neutral state with the clutch C-2 turned on is considered. At this time, the target shift speed GS* is basically any of the fourth to sixth speeds, and thus can be established by only turning on one of the clutch C-1, the clutch C-3, and the brake B-1, although depending on the amount of depression of the accelerator pedal 93. Thus, travel through idle coast can be exited (a shift speed can be established) immediately to perform re-acceleration immediately compared to a case where the vehicle travels with the shift position SP being the neutral position, with both the clutch C-1 and the clutch C-2 turned off. When the target shift speed GS* is the fourth speed, the clutch C-2, which is common to the higher shift speeds (fifth and sixth speeds), is engaged rather than the clutch C-1, which is common to the lower shift speeds (first to third speeds), on the basis of the assumption that travel through idle coast is often performed when the vehicle is traveling at a relatively high vehicle speed.

When the low speed-side change prediction flag F43 is set to a value of 1 or the high speed-side change prediction flag F34 is set to a value of 1 in the prediction control execution determination routine of FIG. 7 during travel through idle coast, it is determined in step S160 that the low speed-side change prediction flag F43 has a value of 1 or the high speed-side change prediction flag F34 has a value of 1, to terminate the routine. The speed change control has been described above. Next, the prediction control execution determination routine of FIG. 7 will be described. The routine is executed repeatedly at intervals of a predetermined time (for example, at intervals of several milliseconds or several tens of milliseconds) by the transmission ECU 80 concurrently with the speed change control routine of FIG. 6 during travel through idle coast with the idle coast execution flag F having a value of 1.

When the prediction control execution determination routine of FIG. 7 is executed, the transmission ECU 80 first receives data required for determination such as the vehicle speed V from the vehicle speed sensor 98 and an acceleration ΔV of the vehicle (step S300), and determines whether or not the clutch C-1 of the automatic transmission 30 is engaged (step S305). Here, the acceleration ΔV of the vehicle may be calculated by calculating the amount of variation (V−preceding V) between a value (preceding V) detected by the vehicle speed sensor 98 a predetermined time earlier and the current vehicle speed V detected by the vehicle speed sensor 98, the predetermined time being the interval between executions of the routine, and dividing the amount of variation by the predetermined time, or may be input from an acceleration sensor (not shown) that detects the acceleration of the vehicle.

If it is determined that the clutch C-1 is not engaged, it is judged that the clutch C-2 is engaged and that the automatic transmission 30 is in the neutral state with the fourth to sixth speeds established, and it is determined whether the acceleration ΔV of the vehicle is less than the value of 0 (step S310). If the acceleration ΔV is not less than the value of 0, it is judged that a change of the target shift speed GS* from the fourth speed or higher to the third speed or lower is not predicted with the automatic transmission 30 in the neutral state, to terminate the routine.

If it is determined that the vehicle is traveling at a reduced speed with the acceleration ΔV having a value less than 0 when the automatic transmission 30 is in the neutral state with the clutch C-1 not engaged and with the fourth to sixth speeds established, a predicted prechange time T43, which is a predicted time before the target shift speed GS* of the automatic transmission 30 in the neutral state is changed from the fourth speed or higher to the third speed or lower, is calculated by obtaining a vehicle speed difference (absolute value |V43−V|) as indicated by the following formula (1), by subtracting the current vehicle speed V from the vehicle speed threshold V43 set in advance in the speed change map of FIG. 5 as the vehicle speed at which a change (downshift) should be made from the fourth speed to the third speed when the accelerator is turned off, and dividing the vehicle speed difference by the acceleration ΔV of the vehicle (step S320). Then, a comparison is made between the calculated predicted prechange time T43 and a first predetermined time T43ref1 (step S330). If the predicted prechange time T43 is more than the first predetermined time T43ref1, the routine is terminated. Here, the first predetermined time T43ref1 is used to determine whether or not to start preparation for an interchange from engagement of the clutch C-2 to engagement of the clutch C-1 with the automatic transmission 30 in the neutral state. In the embodiment, the first predetermined time T43ref1 has been determined in advance through an experiment or the like as a time (about 300 or 500 milliseconds, for example) required to perform fast fill in which the oil chamber of the clutch C-1 is rapidly filled with hydraulic oil at a relatively high hydraulic pressure determined in advance and to execute stand-by control in which the clutch C-1 is caused to stand by (low-pressure stand-by) at a relatively low hydraulic pressure determined in advance to bring the clutch C-1 into a state immediately before engagement with the clutch C-1 having no torque capacity.

$$T43 = |V43 - V|/\Delta V \tag{1}$$

Figure 9:
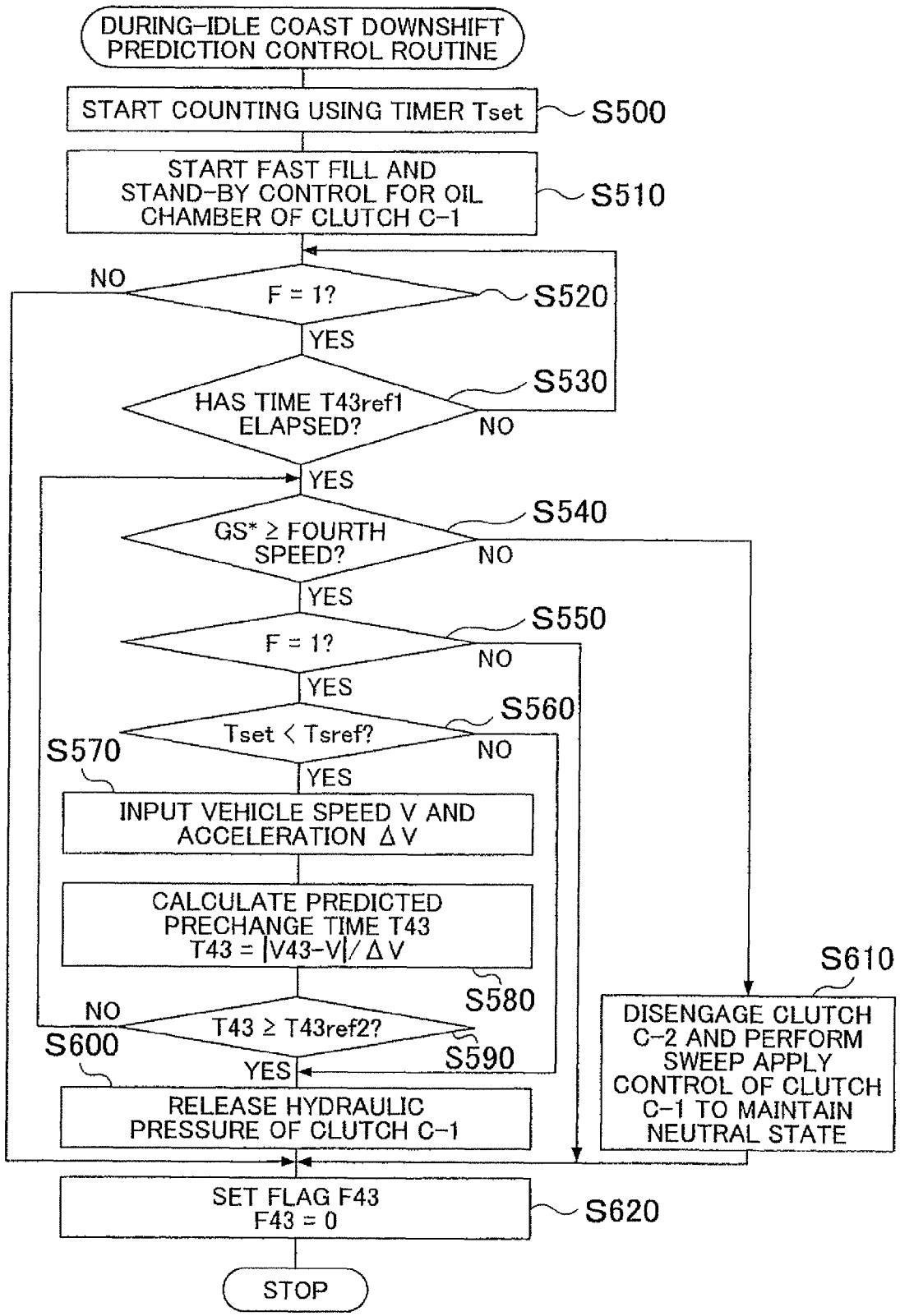
FIG. 9 is a flowchart showing an example of a during-idle coast downshift prediction control routine executed by the transmission ECU 80.

If the predicted prechange time T43 is not more than the first predetermined time T43ref1, it is judged to start preparation for an interchange from engagement of the clutch C-2 to engagement of the clutch C-1. Then, the low speed-side change prediction flag F43 discussed earlier is set to a value of 1 (step S340) to terminate the routine. When the low speed-side change prediction flag F43 is set to a value of 1, it is determined in step S160 of the speed change control routine of FIG. 6 that the low speed-side change prediction flag F43 has a value of 1. Then, the clutches C-1 to C-3 and the brakes B-1 and B-2 are not turned on and off by the speed change control routine, but a during-idle coast downshift prediction control routine of FIG. 9 is executed to control the clutches C-1 and C-2.

If it is determined in step S305 that the clutch C-1 is engaged, it is judged that the automatic transmission 30 is in the neutral state with the first to third speeds established, and it is determined whether or not the acceleration ΔV of the vehicle is more than the value of 0 (step S350). If the acceleration ΔV is not more than the value of 0, it is judged that a change of the target shift speed GS* from the third speed or lower to the fourth speed or higher is not predicted with the automatic transmission 30 in the neutral state, to terminate the routine.

If it is determined that the vehicle is traveling at an increased speed with the acceleration ΔV having a value more than 0 when the automatic transmission 30 is in the neutral state with the clutch C-1 engaged and with the first to third speeds established, a predicted prechange time T34, which is a predicted time before the target shift speed GS* of the automatic transmission 30 in the neutral state is changed from the third speed or lower to the fourth speed or higher, is calculated by obtaining a vehicle speed difference (absolute value |V34−V|) as indicated by the following formula (2), by subtracting the current vehicle speed V from the vehicle speed threshold V34 set in advance in the speed change map of FIG. 5 as the vehicle speed at which a change (upshift) should be made from the third speed to the fourth speed when the accelerator is turned off, and dividing the vehicle speed difference by the acceleration ΔV of the vehicle (step S360). Then, a comparison is made between the calculated predicted prechange time T34 and a first predetermined time T34ref1 (step S370). If the predicted prechange time T34 is more than the first predetermined time T34ref1, the routine is terminated. Here, the first predetermined time T34ref1 is used to determine whether or not to start preparation for an interchange from engagement of the clutch C-1 to engagement of the clutch C-2 with the automatic transmission 30 in the neutral state. In the embodiment, the first predetermined time T34ref1 has been determined in advance through an experiment or the like as a time (set independently of the first predetermined time T43ref1) required to perform fast fill in which the oil chamber of the clutch C-2 is rapidly filled with hydraulic oil at a relatively high hydraulic pressure determined in advance and to execute stand-by control in which the clutch C-2 is caused to stand by at a relatively low hydraulic pressure determined in advance to bring the clutch C-2 into a state immediately before engagement with the clutch C-2 having no torque capacity.

$$T34 = |V34 - V|/\Delta V \tag{2}$$

Figure 10:
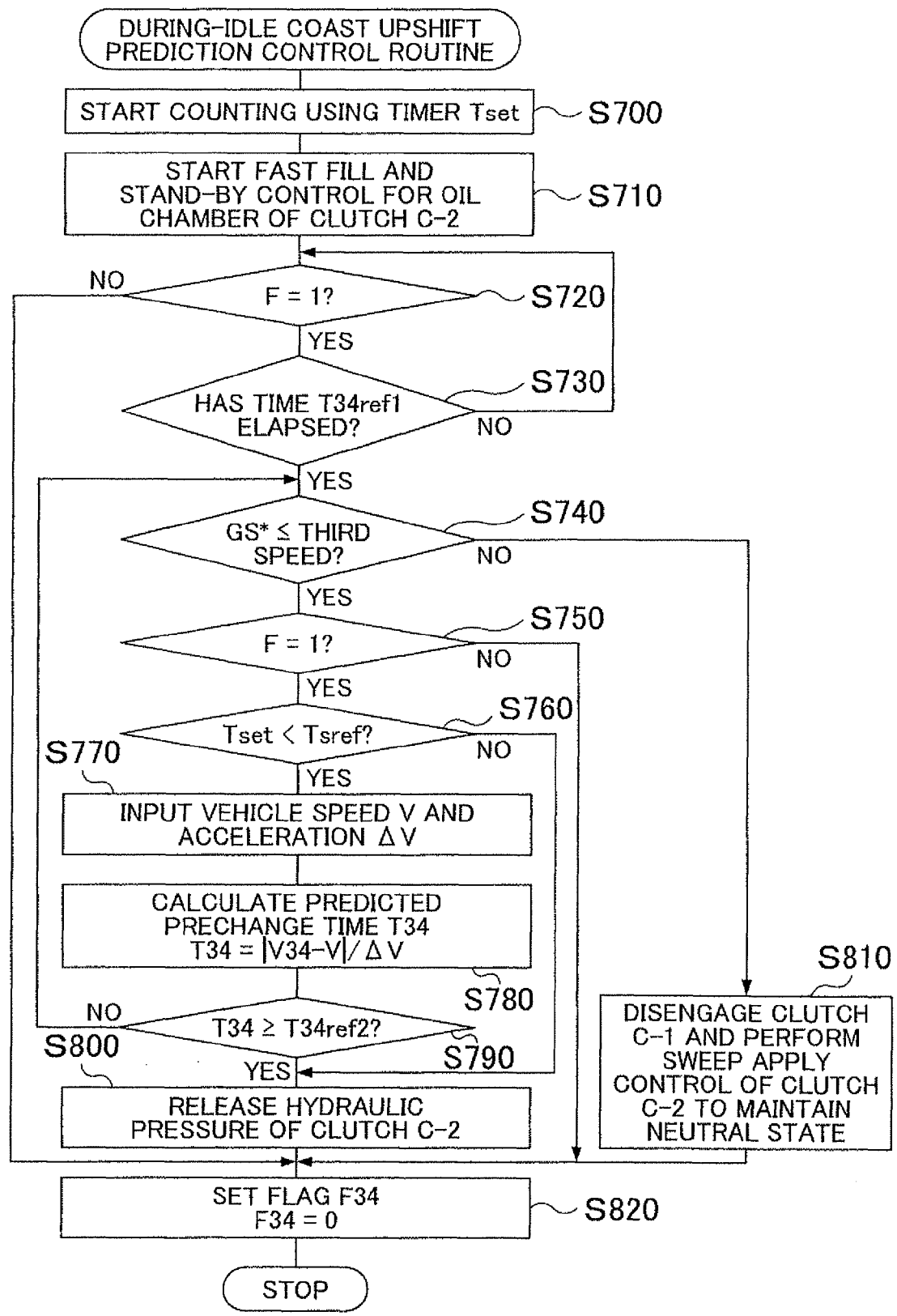
FIG. 10 is a flowchart showing an example of a during-idle coast upshift prediction control routine executed by the transmission ECU 80.

If the predicted prechange time T34 is not more than the first predetermined time T34ref1, it is judged to start preparation for an interchange from engagement of the clutch C-1 to engagement of the clutch C-2. Then, the high speed-side change prediction flag F34 discussed earlier is set to a value of 1 (step S380) to terminate the routine. When the high speed-side change prediction flag F34 is set to a value of 1, it is determined in step S160 of the speed change control routine of FIG. 6 that the high speed-side change prediction flag F34 has a value of 1. Then, the clutches C-1 to C-3 and the brakes B-1 and B-2 are not turned on and off by the speed change control routine executed repeatedly at intervals of a predetermined time, but a during-idle coast upshift prediction control routine of FIG. 10 is executed to control the clutches C-1 and C-2. The prediction control execution determination has been described above. Next, the during-idle coast downshift prediction control routine of FIG. 9 and the during-idle coast upshift prediction control routine of FIG. 10 will be described in this order. The routine of FIG. 9 is executed when the low speed-side change prediction flag F43 is set to a value of 1. The routine of FIG. 10 is executed when the high speed-side change prediction flag F34 is set to a value of 1.

When the during-idle coast downshift prediction control routine of FIG. 9 is executed, the transmission ECU 80 first causes a timer Tset to start counting up from a value of 0 (step S500), starts a sequence of processes including performing fast fill in which the oil chamber of the clutch C-1 is rapidly filled with hydraulic oil at a relatively high hydraulic pressure determined in advance and causing the clutch C-1 to stand by (low-pressure stand-by) at a relatively low hydraulic pressure determined in advance to bring the clutch C-1 into a state immediately before engagement with the clutch C-1 having no torque capacity (step S510), and checks the idle coast execution flag F (step S520). Assuming a situation immediately after execution of the routine is started, it is determined that the idle coast execution flag has a value of 1. Thus, it is determined whether or not the first predetermined time T43ref1 discussed earlier has elapsed since the sequence of processes including performing fast fill of the clutch C-1 and bringing the clutch C-1 into a stand-by state are started (that is, since execution of the routine is started) (step S530). If the first predetermined time T43ref1 has not elapsed, the routine returns to the process in step S520. Here, as discussed earlier, the predetermined time T43ref1 is a time required to perform fast fill of the clutch C-1 and bring the clutch C-1 into a stand-by state. Thus, the processes in steps S520 and S530 are processes for waiting for the clutch C-1 to be subjected to fast fill and be brought into a stand-by state during travel through idle coast.

When fast fill of the clutch C-1 is performed to bring the clutch C-1 into a stand-by state with the idle coast execution flag F still having a value of 1, the target shift speed GS* is checked (step S540). Execution of the routine has been started when the predicted prechange time T43, which is predicted on the basis of the acceleration ΔV of the vehicle etc. as the time before the target shift speed GS* of the automatic transmission 30 in the neutral state is changed from the fourth speed or higher to the third speed or lower, becomes less than the first predetermined time T43ref1. Thus, it is determined in step S540 that the target shift speed GS* is the third speed unless the vehicle speed V is varied after execution of the routine is started. As a result of the determination that the target shift speed GS* is the third speed, the clutch C-2 is turned off (disengaged) and sweep apply control of the clutch C-1 is executed in order to maintain the neutral state (step S610), and the low speed-side change prediction flag F43 is set to a value of 0 (step S620), to terminate the routine. When the low speed-side change prediction flag F43 is changed from a value of 1 to a value of 0, the result of the determination in step S160 of the speed change control routine of FIG. 6 is changed, and the processes in steps S100 to S120, S150, and S160 to S190 are executed in the speed change control routine of FIG. 6 in place of the processes in steps S100 to S120, S150, and S160 which have been executed repeatedly in the speed change control routine of FIG. 6 during travel through idle coast. That is, on/off control of the clutches C-1 and C-2 based on the target shift speed GS* during idle coast is executed in place of downshift prediction control during idle coast.

Figure 11:
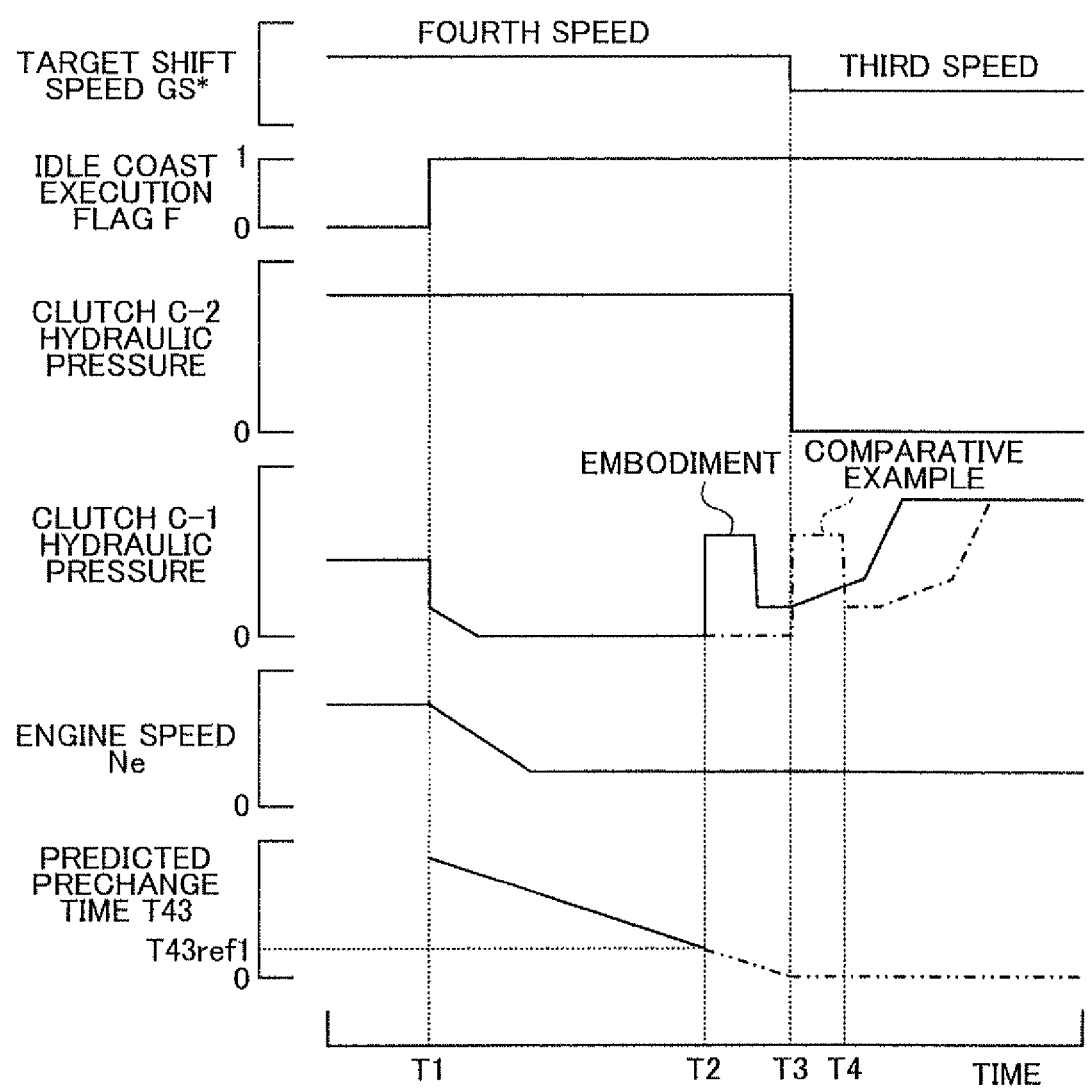
FIG. 11 illustrates an example of temporal changes in target shift speed GS*, idle coast execution flag F, hydraulic pressure of the clutch C-2, hydraulic pressure of the clutch C-1, engine speed Ne, and predicted prechange time T43 in a downshift during travel through idle coast.

FIG. 11 illustrates an example of temporal changes in target shift speed GS*, idle coast execution flag F, hydraulic pressure of the clutch C-2, hydraulic pressure of the clutch C-1, engine speed Ne, and predicted prechange time T43 in a downshift during travel through idle coast. In the drawing, for the hydraulic pressure of the clutch C-1, the solid line corresponds to the embodiment in which the during-idle coast downshift prediction control routine of FIG. 9 is executed, and the dash-and-dot line corresponds to a comparative example in which fast fill of the clutch C-1 is started at the timing when the target shift speed GS* is changed from the fourth speed to the third speed. In addition, for the predicted prechange time T43, the dash-double-dot line corresponds to a case where calculation of the predicted prechange time T43 is continued. As shown in the drawing, when travel through idle coast is started by turning off the accelerator, for example, at time T1 during travel at the fourth speed to hold the hydraulic pressure of the clutch C-2 and release the hydraulic pressure of the clutch C-1, calculation of the predicted prechange time T43 before a change from the fourth speed to the third speed is started, and the predicted prechange time T43 becomes gradually shorter as the vehicle speed V is reduced. In the comparative example, fast fill, stand-by control, and sweep apply control of the clutch C-1 are started at time T3 at which the target shift speed GS* is changed from the fourth speed to the third speed because of a reduction in vehicle speed V. In the embodiment, meanwhile, fast fill and stand-by control of the clutch C-1 are performed when the predicted prechange time T43 becomes equal to or less than the first predetermined time T43ref1 at time T2. Then, sweep apply control of the clutch C-1 is performed when the target shift speed GS* is changed from the fourth speed to the third speed because of a reduction in vehicle speed V at time T3. In the embodiment, by virtue of such control, it is possible to more immediately perform an interchange from engagement of the clutch C-2 to engagement of the clutch C-1 performed when the target shift speed GS* is changed during travel through idle coast.

If it is determined in step S520 that the idle coast execution flag F has a value of 0, it is judged that cancellation of execution of idle coast, that is, exit from idle coast, is requested by depressing the accelerator pedal 93, for example, in the speed change control routine of FIG. 6 although the downshift prediction control during idle coast has been started, and the low speed-side change prediction flag F43 is set to a value of 0 (step S620), to terminate the routine. When the routine is thus terminated, the target shift speed GS* is established in the process in step S210 of the speed change control routine of FIG. 6. For example, assuming a case where execution of idle coast is canceled by depressing the accelerator pedal 93, the target shift speed GS* is basically the fourth speed, although depending on the amount of depression of the accelerator pedal 93. Then, the clutch C-2 is held on (engaged), and the clutch C-1 which is in the middle of fast fill and stand-by control is turned on (engaged).

If it is determined in step S540 that the target shift speed GS* is the fourth speed or higher, the idle coast execution flag F is checked (step S550). If the idle coast execution flag F has a value of 1 and the vehicle is traveling through idle coast, it is determined whether or not the timer Tset indicates a time less than a relatively long timer predetermined time Tsref (such as five seconds or six seconds, for example) (step S560). If the timer Tset indicates a time less than the timer predetermined time Tsref, the vehicle speed V from the vehicle speed sensor 98 and the acceleration ΔV of the vehicle are input to calculate the predicted prechange time T43 using the formula (1) (steps S570 and S580). Then, it is determined whether or not the calculated predicted prechange time T43 is equal to or more than a second predetermined time T43ref2 (about one second, for example) that is slightly longer than the first predetermined time T43ref1 (step S590).

If it is determined that the predicted prechange time T43 is less than the second predetermined time T43ref2, the routine returns to the process in step S540 to repeat the processes in steps S540 to S590. If it is determined that the predicted prechange time T43 is not less than the second predetermined time T43ref2, the hydraulic pressure of the clutch C-1 is released (that is, fast fill of the clutch C-1 is canceled) to turn off (disengage) the clutch C-1 (step S600), and the low speed-side change prediction flag F43 is set to a value of 0 (step S620), to terminate the routine. Such control can cope with a situation where the target shift speed GS* is not changed from the fourth speed or higher to the third speed or lower because the gradient of the running road surface is varied from a flat road to a descending road (downward slope) not to reduce the vehicle speed V, for example, although the predicted prechange time T43 has become equal to or less than the first predetermined time T43ref1 and the downshift prediction control during idle coast has been started. That is, when the predicted prechange time T43 becomes equal to or more than the second predetermined time T43ref2 which is slightly longer than the first predetermined time T43ref1 without a change of the target shift speed GS* from the fourth speed or higher to the third speed or lower, the hydraulic pressure of the clutch C-1 is released with the clutch C-2 held on in response to the target shift speed GS* being the fourth speed or higher, and thus unnecessary supply of a hydraulic pressure to the clutch C-1 can be suppressed. When the routine is thus terminated, the idle coast execution flag F has a value of 1 and the vehicle is traveling through idle coast. Thus, the processes in steps S160 to S200 of the speed change control routine of FIG. 6 are executed to cause the vehicle to travel through idle coast.

If it is determined in step S550 that the idle coast execution flag F has a value of 0, as when it is determined in step S520 that the idle coast execution flag F has a value of 0, it is judged that cancellation of execution of idle coast, that is, exit from idle coast, is requested by depressing the accelerator pedal 93, for example, in the speed change control routine of FIG. 6 although the downshift prediction control during idle coast has been started, and the low speed-side change prediction flag F43 is set to a value of 0 (step S620), to terminate the routine. When the routine is thus terminated, the target shift speed GS* which is basically the fourth speed is established in the process in step S210 of the speed change control routine of FIG. 6.

If it is determined in step S560 that the timer Tset is equal to or more than the relatively long timer predetermined time Tsref, the hydraulic pressure of the clutch C-1 is released to turn off (disengage) the clutch C-1 (step S600), and the low speed-side change prediction flag F43 is set to a value of 0 (step S620), to terminate the routine. Such control can cope with a situation where the target shift speed GS* is not changed from the fourth speed or higher to the third speed or lower, exit from idle coast is not requested, or the predicted prechange time T43 does not become equal to or more than the second predetermined time T43ref2 because of variations in vehicle speed V, although the predicted prechange time T43 has become equal to or less than the first predetermined time T43ref1 and the downshift prediction control during idle coast has been started, thereby terminating the routine. When the routine is thus terminated, the idle coast execution flag F has a value of 1 and the vehicle is traveling through idle coast. Thus, the processes in steps S160 to S200 of the speed change control routine of FIG. 6 are executed to cause the vehicle to travel through idle coast.

Now, a case where the accelerator pedal 93 is depressed in the middle of fast fill and stand-by control of the clutch C-1 to exit from idle coast in a comparative example of FIG. 11 in which fast fill of the clutch C-1 is started at the timing when the target shift speed GS* is changed from the fourth speed to the third speed during travel through idle coast is considered. In this case, in order to establish the target shift speed GS* which is the third speed, hydraulic control for completely engaging the clutch C-1 and hydraulic control for turning the clutch C-2 from off (disengaged) to on (engaged) are required. Therefore, it may take a long time before the target shift speed GS* is established compared to a case where the target shift speed GS* is established from a state in which the clutch C-1 is turned on (engaged) in the neutral state at the target shift speed GS* (third speed). In the embodiment, in contrast, fast fill and stand-by control of the clutch C-1 have been performed before the target shift speed GS* is changed from the fourth speed to the third speed in prediction of such a change. Thus, when the target shift speed GS* is changed from the fourth speed to the third speed as predicted, for example, the clutch C-1 can be turned on (engaged) by only performing sweep apply control of the clutch C-1 along with turning the clutch C-2 from off (disengaged) to on (engaged), thereby suppressing an increase in time before the target shift speed GS* is established. As a result, the responsiveness of re-acceleration during travel through idle coast with the automatic transmission 30 in the neutral state can be improved. The during-idle coast downshift prediction control of FIG. 9 has been described above. Next, during-idle coast upshift prediction control of FIG. 10 will be described.

The processes in steps S700 to S820 of the during-idle coast upshift prediction control routine of FIG. 10 correspond to the processes in steps S500 to S620, respectively, of the during-idle coast downshift prediction control routine of FIG. 9. In the routine of FIG. 10, the clutch C-2 is controlled in steps in which the clutch C-1 is controlled in the routine of FIG. 9, and the clutch C-1 is controlled in steps in which the clutch C-2 is controlled in the routine of FIG. 9. In the routine of FIG. 10, in addition, the first predetermined time T34ref1 and the second predetermined time T34ref2 are used in steps in which the first predetermined time T43ref1 and the second predetermined time T43ref2, respectively, are used in the routine of FIG. 9. The second predetermined time T34ref2 is a time (about one second, for example) that is slightly longer than the first predetermined time T34ref1. In the routine of FIG. 10, further, it is determined whether or not the target shift speed GS* is the third speed or lower in steps in which it is determined in the routine of FIG. 9 whether or not the target shift speed GS* is the fourth speed or higher. In the routine of FIG. 10, moreover, the predicted prechange time T34 is calculated using the vehicle speed threshold V34 etc. to be compared with the second predetermined time T34ref2 in steps in which the predicted prechange time T43 is calculated using the vehicle speed threshold V43 etc. to be compared with the second predetermined time T43ref2 in the routine of FIG. 9. The process in each step of the routine of FIG. 10 is otherwise the same as the process in each step of the routine of FIG. 9, and can be executed in the same manner as in the routine of FIG. 9. Thus, no further details will be described.

Figure 12:
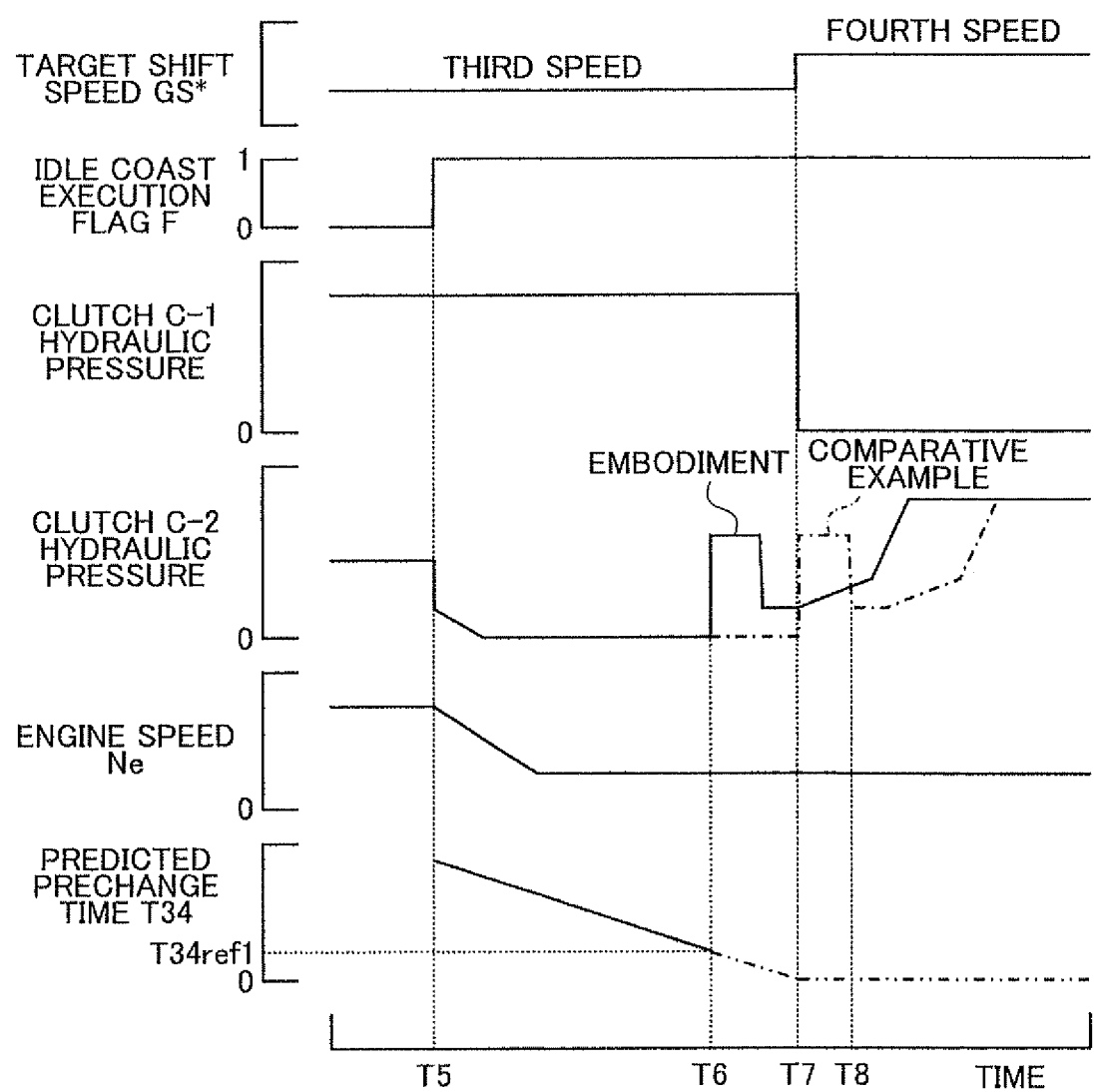
FIG. 12 illustrates an example of temporal changes in target shift speed GS*, idle coast execution flag F, hydraulic pressure of the clutch C-1, hydraulic pressure of the clutch C-2, engine speed Ne, and predicted prechange time T34 in an upshift during travel through idle coast.

FIG. 12 illustrates an example of temporal changes in target shift speed GS*, idle coast execution flag F, hydraulic pressure of the clutch C-1, hydraulic pressure of the clutch C-2, engine speed Ne, and predicted prechange time T34 in an upshift during travel through idle coast. In the drawing, for the hydraulic pressure of the clutch C-2, the solid line corresponds to the embodiment in which the during-idle coast upshift prediction control routine of FIG. 10 is executed, and the dash-and-dot line corresponds to a comparative example in which fast fill of the clutch C-2 is started at the timing when the target shift speed GS* is changed from the third speed to the fourth speed. In addition, for the predicted prechange time T34, the dash-double-dot line corresponds to a case where calculation of the predicted prechange time T34 is continued. As shown in the drawing, when travel through idle coast is started by turning off the accelerator, for example, at time T5 during travel at the third speed to hold the hydraulic pressure of the clutch C-1 and release the hydraulic pressure of the clutch C-2, calculation of the predicted prechange time T34 before a change from the third speed to the fourth speed is started, and the predicted prechange time T34 becomes gradually shorter as the vehicle speed V is increased. In the comparative example, fast fill, stand-by control, and sweep apply control of the clutch C-2 are started at time T7 at which the target shift speed GS* is changed from the third speed to the fourth speed because of an increase in vehicle speed V. In the embodiment, meanwhile, fast fill and stand-by control of the clutch C-2 are performed when the predicted prechange time T34 becomes equal to or less than the first predetermined time T34ref1 at time T6. Then, sweep apply control of the clutch C-2 is performed when the target shift speed GS* is changed from the third speed to the fourth speed because of a reduction in vehicle speed V at time T7. In the embodiment, by virtue of such control, it is possible to more immediately perform an interchange from engagement of the clutch C-1 to engagement of the clutch C-2 performed when the target shift speed GS* is changed during travel through idle coast.

Further, a case where the accelerator pedal 93 is depressed in the middle of fast fill and stand-by control of the clutch C-2 to exit from idle coast in a comparative example of FIG. 12 in which fast fill of the clutch C-2 is started at the timing when the target shift speed GS* is changed from the third speed to the fourth speed during travel through idle coast is considered. In this case, in order to establish the target shift speed GS* which is the fourth speed, hydraulic control for completely engaging the clutch C-2 and hydraulic control for turning the clutch C-1 from off (disengaged) to on (engaged) are required. Therefore, it may take a long time before the target shift speed GS* is established compared to a case where the target shift speed GS* is established from a state in which the clutch C-2 is turned on (engaged) in the neutral state at the target shift speed GS* (fourth speed). In the embodiment, in contrast, fast fill and stand-by control of the clutch C-2 have been performed before the target shift speed GS* is changed from the third speed to the fourth speed in prediction of such a change. Thus, when the target shift speed GS* is changed from the third speed to the fourth speed as predicted, for example, the clutch C-2 can be turned on (engaged) by only performing sweep apply control of the clutch C-2 along with turning the clutch C-1 from off (disengaged) to on (engaged), thereby suppressing an increase in time before the target shift speed GS* is established. As a result, the responsiveness of re-acceleration during travel through idle coast with the automatic transmission 30 in the neutral state can be improved.

In the control of the transmission ECU 80 according to the embodiment described above, the automatic transmission 30 is brought into the neutral state by bringing one engagement element determined in advance, of two engagement elements that need to be engaged to establish the target shift speed GS* set using a speed change map on the basis of the vehicle speed V, into the engaged state and bringing the other engagement element into the disengaged state when predetermined neutral conditions including both the accelerator operation amount Acc and the brake pedal position BP having a value of 0 are met while the vehicle is traveling. This allows the target shift speed GS* of the automatic transmission 30 to be established by only engaging the other engagement element during re-acceleration of the vehicle, thereby immediately establishing the target shift speed GS* for re-acceleration. Then, the processes from fast fill to stand-by control of the clutch C-1 (or the clutch C-2) are started when the predicted prechange time T43 (or the predicted prechange time T34) becomes equal to or less than the first predetermined time T43ref1 (or the first predetermined time T34ref1). The predicted prechange time T43 (or the predicted prechange time T34) is a time predicted on the basis of the acceleration ΔV of the vehicle, and is a time before implementation of a change of the target shift speed GS* from the fourth speed or higher to the third speed or lower (or from the third speed or lower to the fourth speed or higher) that involves changing the clutch C-1 (or the clutch C-2) from the disengaged state to the engaged state in order to maintain the neutral state. This allows the processes from fast fill to stand-by control of the clutch C-1 (or the clutch C-2) to have been started when the predicted prechange time T43 (or the predicted prechange time T34) predicted on the basis of the acceleration ΔV of the vehicle becomes equal to or less than the first predetermined time T43ref1 (or the first predetermined time T34ref1). Thus, it is possible to suppress an increase in time before the target shift speed GS* is established after such establishment of the target shift speed GS* is requested after the target shift speed GS* is changed during travel with the automatic transmission 30 in the neutral state. As a result, the responsiveness of re-acceleration during travel with the automatic transmission 30 in the neutral state can be improved.

In the control of the transmission ECU 80 according to the embodiment, in addition, a hydraulic pressure is supplied to an oil chamber of the clutch C-1 (or the clutch C-2) so as to bring the clutch C-1 (or the clutch C-2) into a state immediately before engagement with the clutch C-1 (or the clutch C-2) having no torque capacity by fast fill and stand-by control when the predicted prechange time T43 (or the predicted prechange time T34) becomes equal to or less than the first predetermined time T43ref1 (or the first predetermined time T34ref1). Thus, it is possible to more reliably suppress an increase in time before the target shift speed GS* is established when such establishment of the target shift speed GS* is requested during travel with the automatic transmission 30 in the neutral state.

In the control of the transmission ECU 80 according to the embodiment, further, the vehicle speed threshold V43 (or the vehicle speed threshold V34) is calculated by obtaining a vehicle speed difference, by subtracting the current vehicle speed V from the vehicle speed threshold V43 (or the vehicle speed threshold V34) at which the target shift speed GS* is changed, and dividing the vehicle speed difference by the acceleration ΔV of the vehicle. Thus, the predicted prechange time T43 (or the predicted prechange time T34) can be calculated more adequately.

In the control of the transmission ECU 80 according to the embodiment, furthermore, supply of a hydraulic pressure to the clutch C-1 (or the clutch C-2) is canceled when the predicted prechange time T43 (or the predicted prechange time T34) becomes equal to or more than the second predetermined time T43ref1 (or the second predetermined time T34ref2) which is longer than the first predetermined time T43ref1 (or the first predetermined time T34ref1) after fast fill and stand-by control of the clutch C-1 (or the clutch C-2) are performed by prediction control during idle coast. Thus, unnecessary supply of a hydraulic pressure to the clutch C-1 (or the clutch C-2) can be suppressed in the case where it is predicted that the target shift speed GS* is not changed even if the second predetermined time T43ref2 (or the second predetermined time T34ref2) elapses since the vehicle speed V is varied by variations in gradient of the running road surface.

In the control of the transmission ECU 80 according to the embodiment, when the predicted prechange time T43 (or the predicted prechange time T34) becomes equal to or less than the first predetermined time T43ref1 (or the first predetermined time T34ref1), fast fill and stand-by control of the clutch C-1 (or the clutch C-2) are performed. However, any control may be performed as long as supply of a hydraulic pressure to the clutch C-1 (or the clutch C-2) is started. For example, only fast fill of the clutch C-1 (or the clutch C-2) may be performed. In this case, the first predetermined time T43ref1 (or the first predetermined time T34ref1) may be a time required to perform fast fill of the clutch C-1 (or the clutch C-2).

In the control of the transmission ECU 80 according to the embodiment, the predicted prechange time T43 (or the predicted prechange time T34) is calculated by obtaining a vehicle speed difference, by subtracting the current vehicle speed V from the vehicle speed threshold V43 (or the vehicle speed threshold V34), and dividing the vehicle speed difference by the acceleration ΔV of the vehicle. However, the predicted prechange time T43 (or the predicted prechange time T34) may be calculated in any manner as long as it is calculated on the basis of variations in vehicle speed V. For example, the predicted prechange time T43 (or the predicted prechange time T34) may be calculated by estimating the time for the vehicle speed V to reach the vehicle speed threshold V43 (or the vehicle speed threshold V34) on the basis of the tendency of variations in vehicle speed V from a predetermined time ago until the present time and the current vehicle speed V.

In the control of the transmission ECU 80 according to the embodiment, supply of a hydraulic pressure to the clutch C-1 (or the clutch C-2) is canceled when the predicted prechange time T43 (or the predicted prechange time T34) becomes equal to or more than the second predetermined time T43ref2 (or the second predetermined time T34ref2) which is longer than the first predetermined time T43ref1 (or the first predetermined time T34ref1) after fast fill and stand-by control of the clutch C-1 (or the clutch C-2) are performed by prediction control during idle coast. However, supply of a hydraulic pressure to the clutch C-1 (or the clutch C-2) may not be canceled when the predicted prechange time T43 (or the predicted prechange time T34) becomes equal to or more than the second predetermined time T43ref2 (or the second predetermined time T34ref2).

In the control of the transmission ECU 80 according to the embodiment, the clutches C-1 to C-3 and the brakes B-1 and B-2 are friction engagement elements having a hydraulic servo. However, some of the clutches and the brakes may be dog clutches and dog brakes.

In the control of the transmission ECU 80 according to the embodiment, in order to bring the automatic transmission 30 into the neutral state, only the clutch C-1 is engaged when the target shift speed GS* is the first to third speeds and only the clutch C-2 is engaged when the target shift speed GS* is the fourth to sixth speeds, that is, an interchange between engagement of the clutch C-1 and engagement of the clutch C-2 is performed when the target shift speed GS* is changed between the third speed and the fourth speed, as shown in FIG. 8. However, only the clutch C-1 may be engaged when the target shift speed GS* is the fourth speed, for example, so that an interchange between engagement of the clutch C-1 and engagement of the clutch C-2 is performed when the target shift speed GS* is changed between the fourth speed and the fifth speed. That is, an interchange of engagement elements may be performed for a change between any two shift speeds, depending on the configuration of the automatic transmission, in order to bring the automatic transmission into the neutral state.

Figures 13, 14:
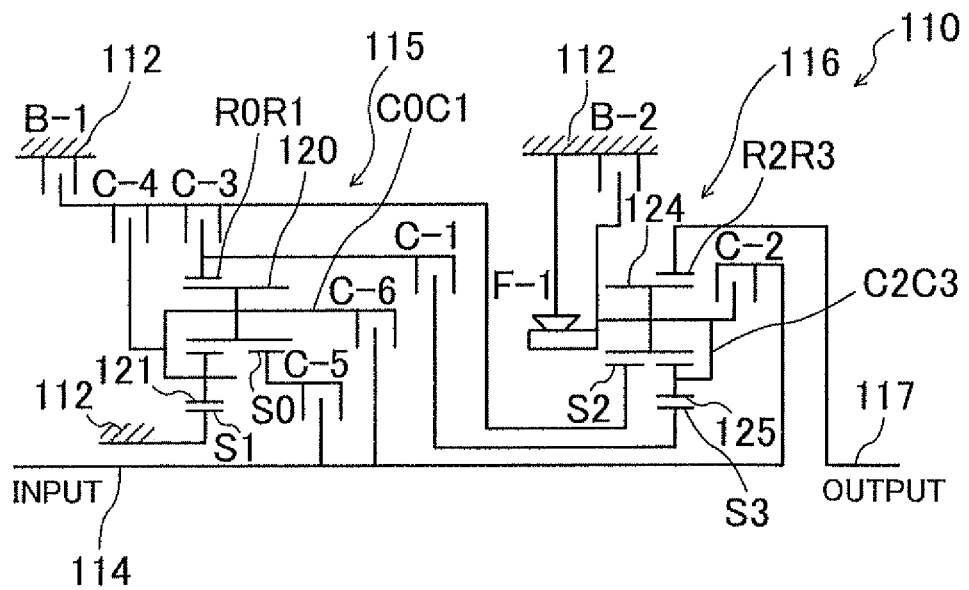
FIG. 13 is a diagram showing a schematic configuration of an automatic transmission 110 according to a modified example.
FIG. 14 is an operation table of the automatic transmission 110 according to the modified example.

The automatic transmission 30 controlled by the transmission ECU 80 according to the embodiment is configured to establish six forward speeds by engaging two of clutches and brakes. However, the automatic transmission 30 may be configured to establish a plurality of forward speeds by engaging three or more of clutches and brakes. In this case, the automatic transmission may be brought into the neutral state with a part of an clutch or brake among the three or more of clutches and brakes for establishing the target shift speed GS* engaged and with the remaining clutches and brakes disengaged during travel through idle coast. Also in this case, it is preferable that a clutch or a brake to be commonly engaged to establish a next shift speed should be engaged. FIG. 13 is a diagram showing a schematic configuration of an automatic transmission 110 according to a modified example in which three of clutches and brakes are engaged to establish ten forward speeds. FIG. 14 is an operation table of the automatic transmission 110 according to the modified example.

The automatic transmission 110 shown in FIG. 13 includes an input shaft 114 connected to an engine side, a speed-reducing composite planetary gear 115, a speed-changing composite planetary gear 116, an output shaft 117 connected to a drive wheel side, clutches C-1, C-2, C-3, C-4, C-5, and C-6, brakes B-1 and B-2, a one-way clutch F-1, etc. The speed-reducing composite planetary gear 115 includes a speed-reducing common carrier C0C1 that rotatably supports a long pinion 120 and a pinion 121 meshed with each other, a first sun gear S0 meshed with the long pinion 120, a second sun gear S1 meshed with the pinion 121, and a speed-reducing common ring gear R0R1 meshed with the long pinion 120. The speed-changing composite planetary gear 116 includes a speed-changing common carrier C2C3 that rotatably supports a long pinion 124 and a pinion 125 meshed with each other, a third sun gear S2 meshed with the long pinion 124, a fourth sun gear S3 meshed with the pinion 125, and a speed-changing common ring gear R2R3 meshed with the long pinion 124. In the speed-reducing composite planetary gear 115, the first sun gear S0 can be coupled to the input shaft 114 via the clutch C-5, and the second sun gear S1 is fixed to a transmission case 112. The speed-reducing common carrier C0C1 can be coupled to the input shaft 114 via the clutch C-6. The third sun gear S2 of the speed-changing composite planetary gear 116 is selectively coupled to the speed-reducing common carrier C0C1 of the speed-reducing composite planetary gear 115 via the clutch C-4, selectively coupled to the speed-reducing common ring gear R0R1 via the clutch C-3, and selectively fixed via the brake B-1. The speed-changing common carrier C2C3 is selectively coupled to the input shaft 114 via the clutch C-2, selectively fixed via the brake B-2, and coupled to the transmission case 112 via the one-way clutch F-1, which is disposed in parallel with the brake B-2, so as not to rotate in reverse. The fourth sun gear S3 is selectively coupled to the speed-reducing common ring gear R0R1 via the clutch C-1. The speed-changing common ring gear R2R3 is directly coupled to the output shaft 117. In the automatic transmission 110 configured as described above, ten forward speeds and four reverse speeds can be established by selectively engaging the clutches C-1 to C-6, selectively engaging the brakes B-1 and B-2, and selectively coupling or fixing the input shaft 114, the output shaft 117, and the respective elements of the speed-reducing composite planetary gear 115 and the speed-changing composite planetary gear 116. In the operation table of FIG. 14, a symbol "0" provided in the field of the clutches C-1 to C-6, the brakes B-1 and B-2, and the one-way clutch F-1 corresponding to each shift speed indicates an engaged, coupled state for a clutch and an engaged, fixed state for a brake. A symbol "(○)" indicates that a hydraulic pressure is supplied to a hydraulic servo in preparation for shifting so that the shifting is performed smoothly, but that the clutch is not transferring torque. A symbol "●" indicates that the brake is engaged when engine braking is applied.

The automatic transmission 30 controlled by the transmission ECU 80 according to the embodiment is formed as a 6-speed automatic transmission. However, the automatic transmission 30 may be formed as a 3-speed, 4-speed, or 5-speed automatic transmission, or may be formed as an automatic transmission with seven, eight, or more speeds.

In the embodiment, the present invention is applied in the form of the transmission ECU 80 serving as a control device for the automatic transmission 30. However, the present invention may be implemented in the form of a control method for the automatic transmission 30.

Here, the correspondence between the main elements of the embodiment and the main elements of the invention described in the "SUMMARY OF THE INVENTION" section will be described. In the embodiment, the automatic transmission 30 corresponds to the "automatic transmission". The transmission ECU 80 which executes the process in step S110 of the speed change control routine of FIG. 6, in which the accelerator operation amount Acc and the vehicle speed V are applied to the speed change map to set the target shift speed GS*, corresponds to the "target shift speed setting means". The transmission ECU 80 which executes the processes in steps S150 and S170 to S190 of the speed change control routine of FIG. 6, in which the automatic transmission 30 is brought into the neutral state with the clutch C-1 or the clutch C-2 engaged in accordance with the target shift speed GS* when both the accelerator operation amount Acc and the brake pedal position BP has a value of 0 during travel with the shift position SP being the D position, corresponds to "during-travel neutral control means". The transmission ECU 80 which executes the process in step S510 of the during-idle coast downshift prediction control routine of FIG. 9, in which fast fill and stand-by control of the clutch C-1 are started when the predicted prechange time T43 becomes equal to or less than the first predetermined time T43ref1 and the low speed-side change prediction flag F43 is set to a value of 1, and the process in step S710 of the during-idle coast upshift prediction control routine of FIG. 10, in which fast fill and stand-by control of the clutch C-2 are started when the predicted prechange time T34 becomes equal to or less than the first predetermined time T34ref1 and the high speed-side change prediction flag F34 is set to a value of 1, corresponds to the "prediction control means". The correspondence between the main elements of the embodiment and the main elements of the invention described in the "SUMMARY OF THE INVENTION" section does not limit the elements of the invention described in the "SUMMARY OF THE INVENTION" section, because such correspondence is an example given for the purpose of specifically describing the invention described in the "SUMMARY OF THE INVENTION" section. That is, the invention described in the "SUMMARY OF THE INVENTION" section should be construed on the basis of the description in that section, and the embodiment is merely a specific example of the invention described in the "SUMMARY OF THE INVENTION" section.

While a mode for carrying out the present invention has been described above by way of an embodiment, it is a matter of course that the present invention is not limited to the embodiment in any way, and that the present invention may be implemented in various forms without departing from the scope and sprit of the present invention.

The present invention is applicable to the automatic transmission manufacturing industry and so forth.

What is claimed is:

1. A control device for an automatic transmission mounted on a vehicle, the automatic transmission includes a plurality of engagement elements that are selectively engaged or disengaged in order to establish a plurality of shift speeds, the control device comprising:
   an electronic control unit that includes control logic, which when executed:
     sets a target shift speed on the basis of a vehicle speed;
     brings the automatic transmission into a neutral state by bringing an engagement element, determined in advance out of engagement elements that need to be engaged to establish the target shift speed, into an engaged state and bringing remaining engagement elements into a disengaged state when predetermined neutral conditions are met while the vehicle is traveling;
     starts a supply of a hydraulic pressure to an oil chamber of a particular engagement element to move a piston of the particular engagement element, with the particular engagement element having no torque capacity, with the engagement element that was engaged to achieve the neutral state kept engaged when a predicted prechange time becomes equal to or less than a predetermined time while the automatic transmission is in the neutral state, the predicted prechange time being a period of time predicted on variations in vehicle speed and the predicted prechange time occurs before implementation of a change of the target shift speed that involves changing the particular engagement element from a disengaged state to an engaged state in order to maintain the neutral state; and
     reduces a hydraulic pressure of the engagement element to a value of zero at a time when the target shift speed is changed, and increases a hydraulic pressure of the particular engagement element.

2. The control device for an automatic transmission according to claim 1, wherein
   the electronic control unit calculates the predicted prechange time by obtaining a vehicle speed difference, by subtracting a current vehicle speed from a vehicle speed threshold determined in advance as a vehicle speed at which the target shift speed is changed, and dividing the vehicle speed difference by an acceleration of the vehicle.

3. The control device for an automatic transmission according to claim 1, wherein
   the engagement element determined in advance is an engagement element that needs to be commonly engaged to establish a shift speed one step lower than the target shift speed or a shift speed one step higher than the target shift speed.

4. The control device for an automatic transmission according to claim 1, wherein
the electronic control unit cancels supply of a hydraulic pressure to the oil chamber of the particular engagement element when the predicted prechange time becomes equal to or more than a second predetermined time which is longer than the predetermined time after supply of a hydraulic pressure to the oil chamber of the particular engagement element is started.

5. A control method for an automatic transmission mounted on a vehicle, the automatic transmission includes a plurality of engagement elements that are selectively engaged or disengaged in order to establish a plurality of shift speeds, the control method comprising:
(a) bringing, using an electronic control unit, the automatic transmission into a neutral state by bringing an engagement element, determined in advance out of engagement elements that need to be engaged to establish a target shift speed set on the basis of a vehicle speed, into an engaged state and bringing remaining engagement elements into a disengaged state when predetermined neutral conditions are met while the vehicle is traveling;
(b) starting, using the electronic control unit, a supply of a hydraulic pressure to an oil chamber of a particular engagement element to move a piston of the particular engagement element, with the particular engagement element having no torque capacity, with the engagement element that was engaged to achieve the neutral state kept engaged when a predicted prechange time becomes equal to or less than a predetermined time while the automatic transmission is in the neutral state, the predicted prechange time being a period of time predicted on variations in vehicle speed and the predicted prechange time occurs before implementation of a change of the target shift speed that involves changing the particular engagement element from a disengaged state to an engaged state in order to maintain the neutral state; and
(c) reducing, using the electronic control unit, a hydraulic pressure of the engagement element to a value of zero at a time when the target shift speed is changed, and increases a hydraulic pressure of the particular engagement element.

* * * * *